United States Patent
Ogata

(10) Patent No.: US 7,821,902 B2
(45) Date of Patent: Oct. 26, 2010

(54) ABERRATION DETECTION DEVICE AND OPTICAL PICKUP DEVICE PROVIDED WITH SAME

(75) Inventor: Nobuo Ogata, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 521 days.

(21) Appl. No.: 11/885,618

(22) PCT Filed: Mar. 2, 2006

(86) PCT No.: PCT/JP2006/303939

§ 371 (c)(1),
(2), (4) Date: Aug. 31, 2007

(87) PCT Pub. No.: WO2006/093212

PCT Pub. Date: Sep. 8, 2006

(65) Prior Publication Data

US 2008/0170481 A1    Jul. 17, 2008

(30) Foreign Application Priority Data

Mar. 2, 2005    (JP) .............................. 2005-058083

(51) Int. Cl.
*G11B 7/135* (2006.01)
(52) U.S. Cl. .............................. 369/112.1; 369/112.12; 369/44.23
(58) Field of Classification Search ............ 369/110.03, 369/112.06, 112.11
See application file for complete search history.

(56) References Cited

U.S. PATENT DOCUMENTS 5,301,182 A * 4/1994 Komma et al. ......... 369/112.12

(Continued)

FOREIGN PATENT DOCUMENTS

JP    2002-157771    5/2002

(Continued)

OTHER PUBLICATIONS

Makoto Horiyama et al.; "Optical Pickup using Integrated Optical Unit for Blu-ray disc"; Jun. 5, 2006.

(Continued)

*Primary Examiner*—Peter Vincent Agustin
*Assistant Examiner*—Jesse Hauck
(74) *Attorney, Agent, or Firm*—Edwards Angell Palmer & Dodge LLP; David G. Conlin, Esq.; David A. Tucker

(57) ABSTRACT

An aberration detection device of the present invention is such that an absolute value of detection sensitivity of an aberration error signal is increased, and variation in detection sensitivity of the aberration error signal is little even when displacement between the center of light beam dividing means and the center of a bundle of light beams occurs due to a shift of a condensing optical system at the time of tracking control. A hologram element (2) divides light beams reflected from an information storage medium into at least two positive first order diffracted light beams. The hologram element (2) has a line (D1) extending in a radial direction and passing through an optical axis (OZ) and a division line (D2) having segments at least both ends thereof and a bulge in a center thereof, wherein the segments are substantially parallel to the line (D1), and the bulge (44) bulges toward the periphery of the hologram element (2) so that a top (D5) of the bulge (44) is substantially parallel to the line (D1).

7 Claims, 14 Drawing Sheets

U.S. PATENT DOCUMENTS

| | | | |
|---|---|---|---|
| 5,859,818 A | | 1/1999 | Tateishi et al. |
| 6,407,967 B1 * | | 6/2002 | Odajima et al. ........ 369/112.12 |
| 6,956,192 B2 * | | 10/2005 | Ishika ................... 369/112.03 |
| 7,206,277 B2 * | | 4/2007 | Ogasawara et al. .... 369/112.12 |
| 2002/0057359 A1 | | 5/2002 | Tadano et al. |
| 2002/0166945 A1 | | 11/2002 | Tadano et al. |
| 2003/0227859 A1 | | 12/2003 | Hirai |
| 2005/0047292 A1 * | | 3/2005 | Park et al. .............. 369/112.07 |
| 2006/0262695 A1 | | 11/2006 | Tsuchida et al. |

FOREIGN PATENT DOCUMENTS

| | | |
|---|---|---|
| JP | 2002-334474 | 11/2002 |
| JP | 2003-323735 | 11/2003 |
| JP | 2005-044466 | 2/2005 |
| WO | WO 2004/088645 | 10/2004 |

OTHER PUBLICATIONS

Y. Kanazawa et al.; "*Spherical Aberration Error Signal Detection for Blu-ray Disc Optical Pickups (I)*"; Extended Abstracts (The 52nd Spring Meeting, 2005); The Japan Society of Applied Physics and Related Societies No. 3; Mar. 29, 2005, 1a-ZH-12; pp. 1315.

Y. Kanazawa et al.; "*Spherical Aberration Error Signal Detection for Blu-ray Disc Optical Pickups (II)*"; Extended Abstracts (The 52nd Spring Meeting, 2005); The Japan Society of Applied Physics and Related Societies No. 3, Mar. 29, 2005; 1a-ZH-13; pp. 1315.

O. Nobuo et al.; "Spherical Aberration Error Detection for Blu-ray Disc Optical Pickups"; First Optical Disc Meeting, May 19, 2005.

Y. Kanazawa et al.; "Integrated Optical Unit for Blu-ray Disc"; p. 50, Nov. 23, 2005, Optics Japan 2005 Extended Abstracts, Optical Society of Japan (Japanese Society of Applied Physics.

* cited by examiner

VARIATION IN THICKNESS OF COVER GLASS (μm)

VARIATION IN THICKNESS OF COVER GLASS (μm)

VARIATION IN THICKNESS OF COVER GLASS (μm)

RADIAL DIRECTION

RADIAL DIRECTION

ABERRATION DETECTION DEVICE AND OPTICAL PICKUP DEVICE PROVIDED WITH SAME

TECHNICAL FIELD

The present invention relates to an aberration detection device for detecting aberration that occurs in a condensing optical system, and an optical pickup device including the aberration detection device. Particularly, the present invention relates to an aberration detection device in which a division pattern of light dividing means is optimized so that detection sensitivity of a spherical aberration error signal does not vary even when the condensing optical system moves at the time of tracking control, and an optical pickup device including the aberration detection device.

BACKGROUND ART

With the increase in the volume of information, an optical disk has recently been required to have a higher recording density. A higher recording density of an optical disk has been achieved by increasing a linear recording density in an information recording layer of the optical disk or decreasing a track pitch. To support for the achievement of a higher recording density of an optical disk, it is necessary to decrease a diameter of a light beam condensed onto the information recording layer of the optical disk.

As a method for decreasing a diameter of a light beam, there are (i) a method in which a light beam having a short wavelength is used and (ii) a method in which an NA (Numerical Aperture) of an objective lens is increased, which objective lens is a condensing optical system of an optical pickup device which records and reproduces an optical disk.

As to the method of using the light beam whose wavelength is short, a technique using a blue-violet semiconductor laser whose wavelength is 405 nm is put into practical use. This allows a red semiconductor laser having a wavelength of 650 nm, which is a light source generally used for DVD, to be replaced by a blue-violet semiconductor laser having a wavelength of 405 nm.

As to the method of increasing the NA of the objective lens, there was conventionally proposed a method in which an objective lens made up of two lenses (a pair of lenses) is used. However, a technique using a single objective lens having a high NA such as 0.85 is put into practical use as a result of an advanced lens designing technique and an advanced lens manufacturing technique.

Generally, the optical disk is arranged such that its information recording layer is covered by a cover glass so as to be protected from dusts and free from any damages. Thus, a light beam passing through the objective lens of the optical pickup device further passes through the cover glass so as to be condensed and focused on the information recording layer below the cover glass.

When the light beam passes through the cover glass, spherical aberration (SA) occurs. The spherical aberration SA is expressed as follows:

$$SA \propto (d/\lambda) \cdot NA^4 \quad (1)$$

As expressed above, the spherical aberration SA is proportional to the thickness d of the cover glass and fourth power of the NA of the objective lens, and the spherical aberration SA is inversely proportional to the wavelength λ of a light source. Generally, the objective lens is designed so that the spherical aberration is offset. As a result of this, the spherical aberration of the light beam passing through the objective lens and the cover glass is sufficiently small.

However, when the thickness d of the cover glass deviates from a predetermined value, the light beam condensed onto the information recording layer has a spherical aberration, so that a diameter of the beam increases. This raises the problem that information is improperly read and written.

Further, according to the foregoing expression (1), the amount of spherical aberration error ΔSA increases as a thickness error Δd of the cover glass increases. From the fact, it is obvious that information on the optical disk is improperly read and written. Further, it is obvious that spherical aberration SA increases as a wavelength λ of a light source decreases.

Moreover, a multilayered optical disk in which information recording layers are laminated for higher density of recorded information in a direction of the thickness of the optical disk has been put into commercial production.

Examples of the multilayered optical disk include DVD (Digital Versatile Disc) and BD (Blu-ray Disc) each of which has two information recording layers. In the optical pickup device for recording/reproducing information on/from such a multilayered optical disk, it is necessary to condense the light beam onto each information recording layer of the optical disk in such a manner that a condensed light spot is sufficiently small.

In the optical disk having plural information recording layers, a distance between a surface (cover glass surface) of the optical disk and one information recording layer is different from a distance between the surface and another information recording layer. Thus, the information recording layers are different from each other in terms of the spherical aberration which occurs at the time when the light beam passes through the cover glass of the optical disk. In this case, according to the expression (1), spherical aberration which occurs between adjacent information recording layers varies (error ΔSA) in proportion to a distance t (corresponding to d) between the adjacent information recording layers.

In case of a DVD having two information recording layers, the NA of the objective lens of the optical pickup device is small (about 0.6). Therefore, it is obvious that a slightly larger thickness error Δd in the cover glass has little influence on the of the spherical aberration error ΔSA according to the expression (1).

Thus, in the DVD device using a conventional optical pickup device whose NA is about 0.6, the thickness error Δd in the cover glass of the DVD causes small spherical aberration error ΔSA. This makes it possible to condense the light beam onto each information recording layer in such a manner that a condensed light spot is sufficiently small.

However, even with the same thickness errors Δd in the cover glasses, a large spherical aberration SA occurs with increase of the NA. For example, if the NA is changed from 0.6 to 0.85, the spherical aberration SA becomes 4 times greater. Furthermore, even with the same thickness errors Δd in the cover layers, a large spherical aberration SA occurs with decrease of a wavelength. For example, if the wavelength λ is changed from 650 nm to 405 nm, the spherical aberration SA becomes about 1.6 times greater. Thus, in the BD using a short wavelength light source and a high numerical aperture, the spherical aberration SA is about 6.4 times greater than that of the DVD.

Similarly, in the case of the multilayered optical disk, even with the same distances t between the adjacent information recording layers, the spherical aberration difference (error ΔSA) increases as the NA of the objective lens of the optical pickup device. For example, if the NA is changed from 0.6 to 0.85, the spherical aberration error becomes about 4 times more greatly. Therefore, according to the expression (1), it is obvious that the error in spherical aberration between the information recording layers increases as the NA increases to 0.85, for example.

In this way, the objective lens having a high NA raises such a problem that the spherical aberration error is not ignorable and would drop accuracy in reading information. Thus, it is necessary to correct the spherical aberration in order to realize higher-density recording with the objective lens whose NA is high.

For example, Patent Document 1 and other documents discloses, as a technique for correcting the spherical aberration, a technique in which: a hologram element divides returning light beams, having been reflected by the optical disk and being condensed onto the hologram element, into a first light beam that is near an optical axis of the bundle of light beams and a second light beam that is outer than the first light beam (near the periphery of the bundle of light beams), and a difference between a position at which the first light beam is condensed and a position at which the second light beam is condensed is used to detect and correct the spherical aberration.

With reference to FIG. 14, the following will describe a general configuration of the optical pickup device disclosed in Patent document 1.

In an optical pickup device 200, a hologram element 210, a collimator lens 203, and an objective lens 204 are disposed in an optical axis OZ that is formed between an light beam emission surface of a semiconductor laser 201 and a light beam reflection surface of the optical disk 206. A light detector 207 is disposed at a position where diffracted light from the hologram element 210 is condensed. Note that the hologram element 210 may be replaced by a hologram element 220 having a division pattern (hologram pattern) which is different from that of the hologram element 210.

More specifically, in the optical pickup device 200, light beams emitted from the semiconductor laser 201 pass through the hologram element 210 as zero order diffracted light, and the zero order diffracted light is converted into parallel light by the collimator lens 203, and the parallel light is condensed onto an information recording layer 206c or 206d, which will be described later, on the optical disk 206 via the objective lens 204.

Meanwhile, light beams reflected by the information recording layer 206c or 206d of the optical disk 206 pass through the objective lens 204 and the collimator lens 203 in this order and become incident on the hologram element 210, and the incident light is diffracted by the hologram element 210 so as to be condensed on the light detector 207. The light detector 207 is disposed at a position where positive first-order light from the hologram element 210 is focused.

The optical disk 206 is made up of a cover glass 206a, a substrate 206b, and the above-mentioned two information recording layers 206c and 206d, which are formed between the cover glass 206a and the substrate 206b. That is, the optical disk 206 is an optical disk having two layers. The optical pickup device 200 causes light beams to be condensed onto the information recording layer 206c or 206d, so as to reproduce information from the information recording layer 206c or 206d and record information onto the information recording layer 206c or 206d.

A division pattern of the hologram element 210 used in the first conventional example will be described in detail with reference to FIG. 15. The hologram element 210 has the following three regions: a first region 210a; a second region 210b; and a third region 210c.

The first region 210a is a region which is surrounded by a line D11 extending in a radial direction orthogonal to the optical axis OZ and an arc of a first semicircle E11 (whose radius is r11) centered about the optical axis OZ. Further, the second region 210b is surrounded by an arc of a second semicircle E12 (whose radius is r12; r12>r11) centered about the optical axis OZ, the arc of the first semicircle E11 (whose radius is r11), and the line D11. The third region 210c is a region which is surrounded by an arc of a third semicircle E13 (whose radius is r12) and the line D11. The third semicircle E13 is located opposite to the first semicircle E11 and the second semicircle E12 (located in a negative Y direction in FIG. 15) with respect to the line D11. It is possible to maximize detection sensitivity of a spherical aberration error signal (hereinafter referred to as "SAES") when r11 is set to r11=0.7r10 where r10 (r12>r10>r11) is a radius of an effective radius of the light beam 208 determined by an aperture of the objective lens 204 (FIG. 14) on the hologram element 210.

Next, a division pattern of the hologram element 220 used in the second conventional example will be described in detail with reference to FIG. 16. The hologram element 220 has the following three regions: a first region 220a; a second region 220b; and a third region 220c. The first region 220a is a region surrounded by a line D21 extending in a radial direction orthogonal to the optical axis OZ, a line D22 at a distance h5 away from the line D21 in a Y direction, and arcs E21 and E22 of a circle (whose radius is r12) centered about the optical axis OZ. The second region 220b is a region surrounded by the line D22 and an arc E23 of the circle (whose radius is r12) centered about the optical axis OZ. The third region 220c is a region surrounded by the line D21 and an arc E24 of a semicircle (whose radius is r12) centered about the optical axis OZ.

Assume that r10 (r12>r10) is an effective radius of the light beam 208 determined by an aperture of the objective lens 204 (FIG. 14) on the hologram element 220. In this case, a distance h5 between the lines D21 and D22 is set to h5=0.6r10. Thus, since the first region 220a and the second region 220b are divided by the line D22 extending in the radial direction, no influence of an objective lens shifting at the time of tracking control occurs. This causes little variation in detection sensitivity of the SAES.

[Patent Document 1]

Japanese Unexamined Patent Publication No. 157771/2002 (Tokukai 2002-157771; published on May 31, 2002)

DISCLOSURE OF INVENTION

However, the first conventional example and the second conventional example give rise to the following problem.

In the hologram element 210 illustrated in FIG. 15 and used in the first conventional example, the light beams are divided by the arc of the circle having the radius r11 centered about the optical axis OZ (radius r11 that is approximately 70% of the effective radius r10 of the bundle of light beams 208 determined by the aperture of the objective lens 204). This makes it possible to detect a maximum focal point deviation in divided light beams. Therefore, it is possible to detect the SAES with high sensitivity. However, when the center of the hologram element 210 and the center of the bundle of light beams are displaced in the radial direction by shifting of the objective lens at the time of tracking control, sensitivity of the SAES is greatly changed and detection sensitivity of the SAES decreases.

On the other hand, in the hologram element 220 illustrated in FIG. 16 and used in the second conventional example, the light beams are divided by the line D22 in the radial direction.

This causes no variation in detection sensitivity of the SAES even when the center of light beam dividing means and the center of the bundle of light beams are displaced in the radial direction by shifting of the objective lens at the time of tracking control. However, an absolute value of detection sensitivity of the SAES becomes low (signal quality of the SAES becomes poor) since the division manner in FIG. 16 is greatly different from the division manner that maximizes an absolute value of detection sensitivity of the SAES (division by the arc having the radius r11 that is approximately 70% of the effective radius r10 of the bundle of light beams 208 determined by the aperture of the objective lens 204; see FIG. 15).

The present invention has been attained to solve the above problems, and an object thereof is to provide (a) an aberration detection device in which a division manner (division pattern) of the light beam dividing means which divides light beams is optimized so that an absolute value of detection sensitivity of the spherical aberration error signal is increased (signal quality is secured) while variation in detection sensitivity of the spherical aberration error signal due to the objective lens shifting at the time of tracking control is sufficiently decreased (restrained), and (b) an optical pickup device including the aberration detection device.

In order to solve the above problems, an aberration detection device is an aberration detection device including: light beam dividing means which divides a bundle of light beams passing through a condensing optical system and reflected from an information storage medium into first light beams and second light beams, the first light beams including an optical axis of the bundle of light beams, the second light beams not including the optical axis; light detecting means having a plurality of light receiving sections which separately receive the first light beams and the second light beams, which are obtained by the light beam dividing means; and spherical aberration detecting means which detects spherical aberration of the condensing optical system on the basis of the amount of the first light beams received by the light receiving sections and the amount of the second light beams received by the light receiving sections, wherein the light beam dividing means has a first border and a second border, the first border extending in a radial direction and passing through the optical axis, the second border having segments at least both ends thereof and a bulge in a center thereof, the segments being substantially parallel to the first border, the bulge bulging toward a periphery of the light beam dividing means so that a top of the bulge is substantially parallel to the first border.

The radial direction herein is a direction that is orthogonal to a direction of a track (track direction) formed on the optical storage medium and an optical axis direction.

In a case where spherical aberration occurs in the condensing optical system, a focal point (point having a minimum diameter of the bundle of light beams) of a light beam near the optical axis is different from that of a light beam near the periphery of the bundle of light beams. By using this focal point deviation, it is possible to obtain a spherical aberration error signal. In this case, the greater focal point deviation, the higher sensitivity of the spherical aberration error signal. Therefore, it is important how the light beam dividing means divides light. That is, a division manner (division pattern) of the light beam dividing means is important. Further, in order to obtain a proper spherical aberration error signal, it is necessary to decrease the variation in detection sensitivity of the spherical aberration error signal, which variation caused by tracking control.

As described previously, the conventional aberration detection device is merely an aberration detection device which includes light beam dividing means that satisfies either (i) a high absolute value of detection sensitivity of the spherical aberration error signal and (ii) little variation in detection sensitivity of the spherical aberration error signal. Conventionally, there was no aberration detection device which includes light beam dividing means that satisfies both (i) and (ii).

On the contrary, according to the above arrangement, the light beam dividing means included in the aberration detection device has a first border and a second border, the first border extending in a radial direction and passing through the optical axis, the second border having segments at least both ends thereof and a bulge in a center thereof, the segments being substantially parallel to the first border, the bulge bulging toward a periphery of the light beam dividing means so that a top of the bulge is substantially parallel to the first border.

Thus, in the second border extending in the radial direction, the top of the bulge bulging toward the periphery is substantially parallel to the radial direction (direction in which the first border extends), and portions other than the bulge (at least both ends) extend substantially parallel to the radial direction. In this manner, the second border has lines extending in the radial direction at the top of the bulge and the portions other than the bulge. Therefore, even when the condensing optical system is shifted in the radial direction by tracking control for the reason that there is no match between the center of the light beam dividing means and the center of the bundle of light beams, it is possible to prevent light beams from being condensed onto divided regions of the light beam dividing means which are different from divided regions onto which the light beams are supposed to be condensed.

This prevents light beams divided by the divided regions from being received by light receiving sections of the light detecting means which are different from light receiving sections that are supposed to receive the light beams, and it is possible to decrease the variation of the spherical aberration error signal obtained from the light receiving sections. Therefore, the aberration detection device of the present invention satisfies the above (ii).

According to the above arrangement, the second border bulges toward the periphery of the light beam dividing means at the center thereof. Thus, the second border which bulges at the center thereof (bulge at the center of the second border) allows the light beam dividing means to have a division pattern in which a division near the center thereof is similar to a semicircle centered about the optical axis. Therefore, it is possible to detect the spherical aberration error signal of a high sensitivity by using difference in condensing point between the divided regions. Accordingly, it is possible to increase an absolute value of detection sensitivity of the spherical aberration error signal (enhance signal quality). That is, the aberration detection device of the present invention satisfies the above (i).

Therefore, it is possible to sufficiently decrease (restrain) the variation in detection sensitivity of the spherical aberration error signal, which variation is caused by objective lens shifting at the tracking control, while increasing an absolute value of the detection sensitivity of the spherical aberration error signal (securing signal quality).

Additional objects, features, and strengths of the present invention will be made clear by the description below. Further, the advantages of the present invention will be evident from the following explanation in reference to the drawings.

BEST MODE FOR CARRYING OUT THE INVENTION

The following will describe an embodiment of the present invention with reference to FIGS. 1 through 13(b). The following description of the present embodiment assumes that an aberration detection device of the present invention is used for an optical pickup device included in an optical recording/reproducing apparatus which optically records/reproduces information onto/from an optical disk as an optical storage medium.

Figure 2:
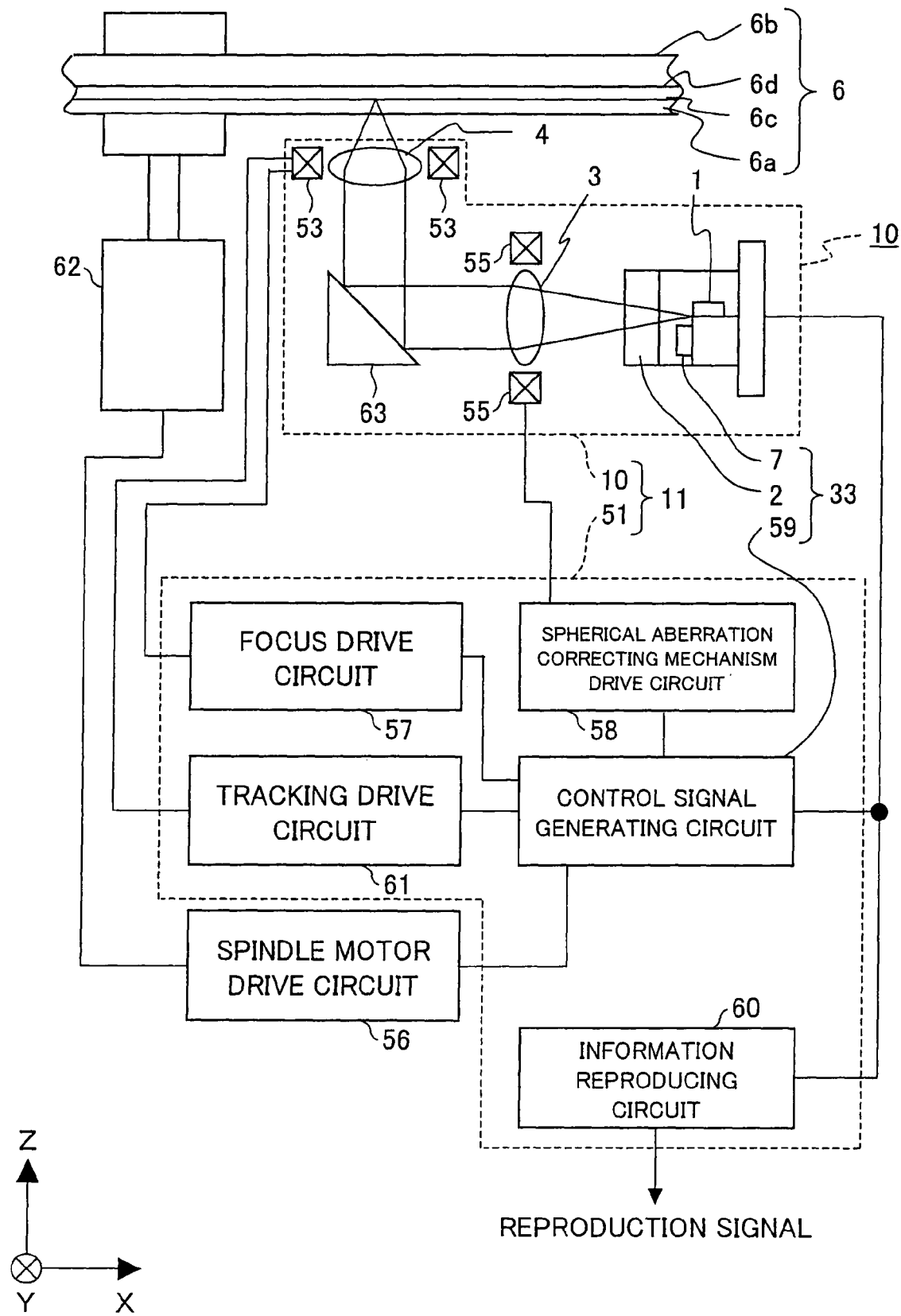
FIG. 2 is an explanatory view illustrating a general configuration of an optical recording/reproducing apparatus including the optical pickup device of the present invention.

FIG. 2 is an explanatory view illustrating a general configuration of an optical recording/reproducing apparatus including an optical pickup device of the present invention. As illustrated in FIG. 2, the optical recording/reproducing apparatus of the present embodiment includes: a spindle motor 62 which rotates an optical disk (information storage medium) 6 that is an optical storage medium; a spindle motor drive circuit 56 for controlling the spindle motor 62 to be driven; and an optical pickup device 11.

The optical pickup device 11 includes: an optical pickup 10 that is an essential part of the optical pickup device 11; and a drive control section 51 for controlling the optical pickup 10 to be driven.

The optical pickup 10 has: a semiconductor laser (light source) 1 for irradiating the optical disk 6 with light beams; a hologram element (light beam dividing means) 2; a collimator lens 3; an objective lens (condensing optical system) 4; and a light detector (light detecting means) 7.

Between the objective lens 4 and the collimator lens 3, a mirror 63 is provided which refracts at approximately 90° the light path of light beams coming from the collimator lens 3 or the objective lens 4.

The objective lens 4 is driven in an optical axis direction (Z direction in FIG. 2) or a radial direction (X direction in FIG. 2) by an objective lens drive mechanism 53 which is disposed on the sides facing a periphery of the objective lens 4. The driving in this manner allows a condensing spot to follow a predetermined point of an information recording layer 6c or 6d on the optical disk 6 even when the optical disk 6 has a runout or is eccentric. The radial direction herein means a direction of a track formed on the optical disk 6 and a direction orthogonal to the optical axis direction.

The collimator lens 3 is driven in an optical axis direction (X direction in FIG. 2) by a spherical aberration correcting mechanism (actuator for spherical aberration correction) 55 which is disposed on the sides facing the periphery of the collimator lens 3. The driving in this manner corrects spherical aberration that occurs in an optical system (objective lens 4) of the optical pickup 10. The optical disk 6, the hologram element 2, and the light detector 7 will be described in detail later.

The drive control section 51 has: a focus drive circuit 57 and a tracking drive circuit 61 both of which controls the objective lens drive mechanism 53 to be driven; a spherical aberration correcting mechanism drive circuit (aberration correcting circuit; spherical aberration correcting means) 58 which controls the spherical aberration correcting mechanism 55 to be driven; a control signal generating circuit (control circuit; spherical aberration detecting means) 59 for generating a control signal to be supplied to the drive circuits on the basis of a signal supplied from the light detector 7; and an information reproducing circuit 60 for reproducing information recorded on the optical disk 6 from signals supplied from the light detector 7 so as to generate a reproduction signal RF (described later).

The aberration detection device of the present invention is a device having the hologram element 2, the light detector 7, and the control circuit 59, and represented by a reference numeral 33 in FIG. 2.

The control circuit 59 generates a tracking error signal (TES), a focus error signal (FES), and a spherical aberration error signal (SAES), in response to signals supplied from the light detector 7. The control circuit 59 sends the TES, the FES, and the SAES to the tracking drive circuit 61, the focus drive circuit 57, and the aberration correcting circuit 58, respectively. The drive circuits control the corresponding members, in line with the supplied respective error signals.

More specifically, when receiving the FES from the control circuit 59, the focus drive circuit 57 controls the objective lens drive mechanism 53 in accordance with a value of the received FES, so that the objective lens drive mechanism 53 moves the objective lens 4 in the optical axis direction (Z direction in FIG. 2) so as to correct focal point deviation of the objective lens 4. Meanwhile, when receiving the SAES from the control circuit 59, the aberration correcting circuit 58 controls the spherical aberration correcting mechanism 55 in accordance with a value of the received SAES, so that the spherical aberration correcting mechanism 55 moves the collimator lens 3 in the optical axis direction (X direction in FIG. 2) so as to correct spherical aberration occurring in the optical system of the optical pickup 10.

When receiving the TES, the tracking drive circuit 61 controls the objective lens drive mechanism 53 in accordance with a value of the received signal, so that the objective lens drive mechanism 53 moves the objective lens 4 in the radial direction (X direction in FIG. 2) so as to correct tracking point deviation of the objective lens 4.

Figure 3:
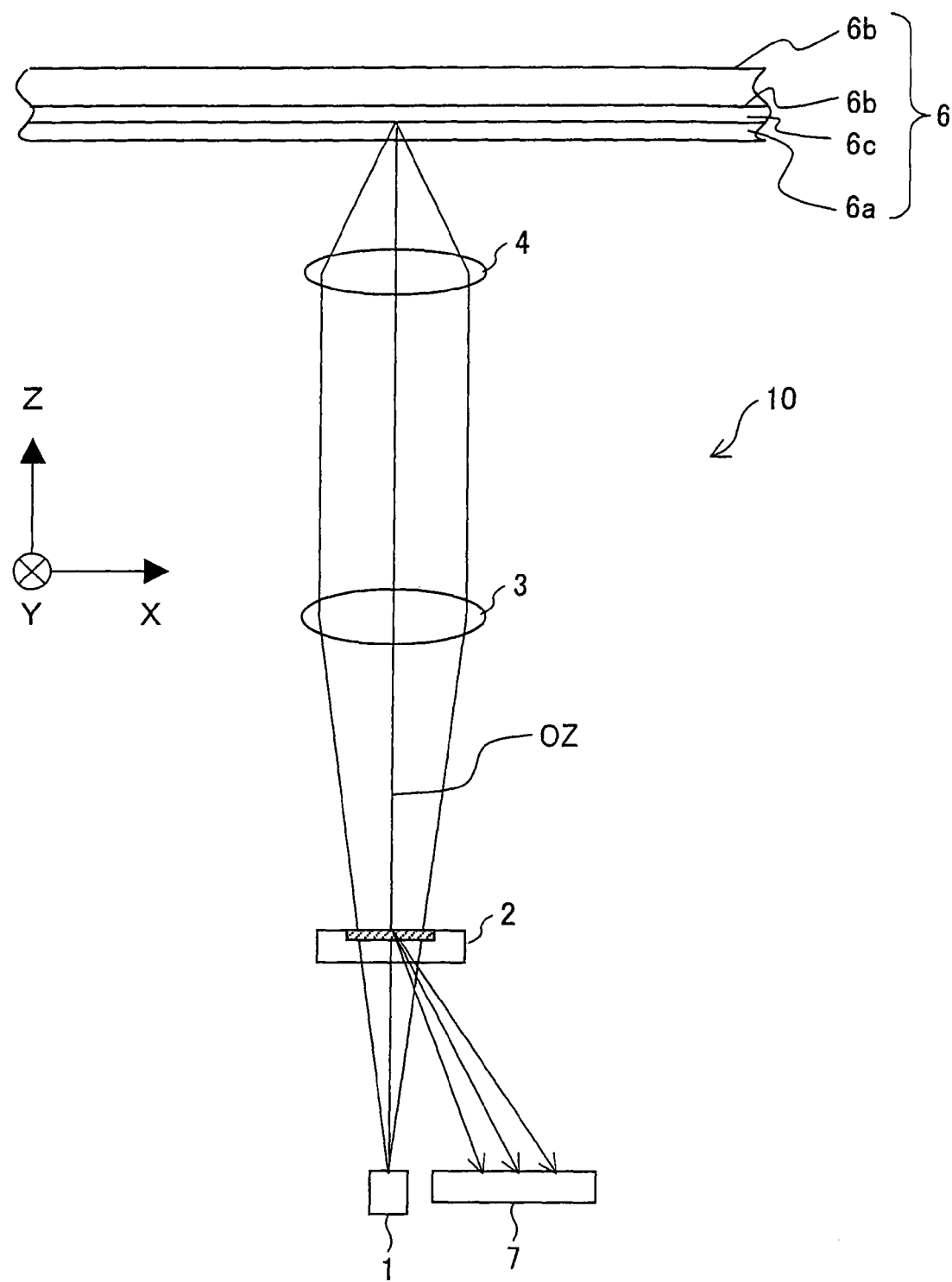
FIG. 3 is an explanatory view illustrating a general configuration of the optical pickup device including the hologram element illustrated in FIG. 1.

FIG. 3 is an explanatory view illustrating a general configuration of the optical pickup 10 that is an essential part of the optical pickup device 11. The following will describe details of the optical pickup 10 with reference to FIG. 3. For convenience of explanation, the mirror 63 illustrated in FIG. 2 is omitted in the optical pickup 10 illustrated in FIG. 3.

In the optical pickup 10, the hologram element 2, the collimator lens 3, and the objective lens 4 are disposed on an optical axis OZ which is formed between a light beam emission surface of the semiconductor laser 1 and a light beam reflection surface of the optical disk. The light detector 7 is disposed at a position where diffracted light from the hologram element 2 is focused.

More specifically, in the optical pickup 10, light beams emitted from the semiconductor laser 1 pass through the hologram element 2 as zero order diffracted light, and the zero order diffracted light is converted into parallel light by the collimator lens 3, and the parallel light is condensed onto an information recording layer 6c or 6d on the optical disk 6 via the objective lens 4.

While, light beams reflected by the information recording layer 6c or 6d of the optical disk 6 pass through the objective lens 4 and the collimator lens 3 in this order and become incident on the hologram element 2, and the incident light is diffracted by the hologram element 2 so as to be condensed on the light detector 7. That is, the light detector 7 is disposed at a position where positive first-order light from the hologram element 2 is focused.

The optical disk 6 is made up of a cover glass 6a, a substrate 6b, and the two information recording layers 6c and 6d, which are formed between the cover glass 6a and the substrate 6b. That is, the optical disk 6 is an optical disk having two layers. The optical pickup 10 causes light beams to be condensed onto the information recording layer 6c or 6d, so as to reproduce information from the information recording layer 6c or 6d and record information onto the information recording layer 6c or 6d.

Therefore, the following descriptions assume that the information recording layer of the optical disk 6 is either the information recording layer 6c or the information recording layer 6d, and the optical pickup 10 condenses light beams onto both of the information recording layers so as to record or reproduce information.

Figure 1:
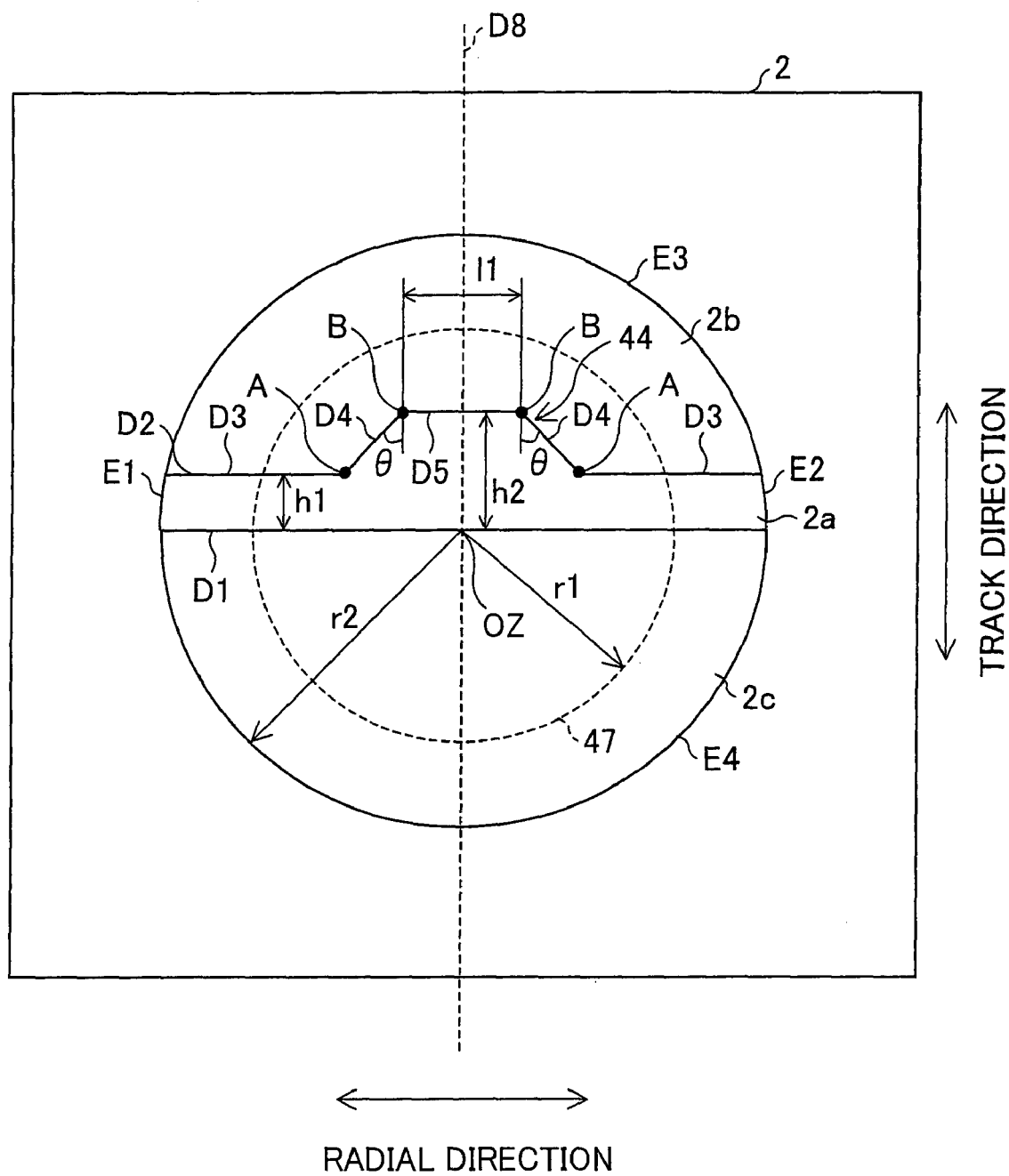
FIG. 1 is an explanatory view illustrating details of a hologram pattern of a hologram element used for an optical pickup device of the present invention.

Next, the following will describe details of a division manner (division pattern) of the hologram element 2, which is the most important in the present invention. FIG. 1 is an explanatory view illustrating a division manner (division pattern) of the hologram element which is used for the optical pickup device 11 and one of the components constituting the aberration detection device 33. As illustrated in FIG. 1, the hologram element 2 is divided into the following three regions: a first region 2a; a second region 2b; and a third region 2c.

The first region 2a is a region surrounded by a line (first border) D1 passing through an optical axis OZ and extending in the radial direction, a division line (second border) D2, and arcs E1 and E2 of a circle (whose radius is r2) centered about the optical axis OZ.

The division line D2 has a protrusion part 44, at the center thereof, that protrudes (bulges) toward the periphery of the hologram element 2, and a top (line D5 (described later)) of the protrusion part (bulge) 44 is substantially parallel to the radial direction.

More specifically, the division line D2 is made up of a pair of lines (first lines) D3, a pair of line segments (second lines) D4, and a line (top of bulge) D5. The lines D3 are located at both ends of the hologram element 2 and parallel to the radial direction in such a manner so as to be axially symmetric to each other about a line (track line) D8 that passes through the optical axis OZ and is parallel to the track direction of the optical disk 6. The line segments D4 are inclined toward the line D8 from end points (first end points) A of the lines D3 on the optical axis OZ side and extend away from the line D1 and toward the line D8, in such a manner so as to be axially symmetric to the line D8. The line D5 is formed by connecting end points (second end points) B of the line segments D4 which end points B are opposite to the end points A.

That is, the protrusion part 44 is made up of the line segments D4 and the line 5. Although the above description assumes that the line segments D4 are straight lines, the line segments D4 are not limited to straight lines and may be curved line segments. In other words, the protrusion part 44 can be of any shape, provided that the protrusion part 44 is bulged at the center part of the division line D2 and the top (line D5) of the bulge is parallel to the radial direction.

It is preferable that a distance h1 between the pair of lines D3 and the line D1 is 30% of an effective radius r1 of the bundle of light beams 47 determined by the aperture of the objective lens 4 on the hologram element 2 (h1=0.3r1), and a distance h2 between the straight lines D1 and D5 is 60% of the effective radius r1 of the bundle of light beams 47 (h2=0.6r1). That is, it is preferable that the line D5 is located further away from the line D1 than the pair of lines D3. Further, it is preferable that a length (length of the top of the bulge) 11 of the line D5 is 60% of the effective radius r1 of the bundle of the light beams 47 (l1=0.6r1).

The angle θ of the inclination of the line segments D4 relative to the line D8 is preferably ±45 degrees (θ=45 deg). ±45 degrees means that the angle of the inclination of one of the line segments D4 is +45 deg and the angle of the inclination of the other line segment D4 is −45 deg in consideration that the line segments D4 are a pair of straight lines.

The second region 2b is a region surrounded by the division line D2 and an arc E3 of a circle (whose radius is r2) centered about the optical axis OZ. The third region 2c is a region surrounded by the line D1 and an arc E4 of the circle (whose radius is r2) centered about the optical axis OZ. The radius r2 is set so as to be sufficiently larger than the effective radius r1, in consideration of shifting of the objective lens and an alignment error.

The above numerical values, h1=0.3r1, h2=0.6r1, θ=45 deg, l1=0.6r1 are the ones obtained as a result of diligent research made by the present inventor. These numerical values will be described with an experimental result later.

As described previously, the hologram element 2 allows light beams emitted from the semiconductor laser 1 to be transmitted as zero order diffracted light toward the optical disk 6, and diffracts reflected light coming from the optical disk 6 so as to guide the diffracted light (positive first order diffracted light) to the light detector 7 (see FIG. 3).

Figure 4A:
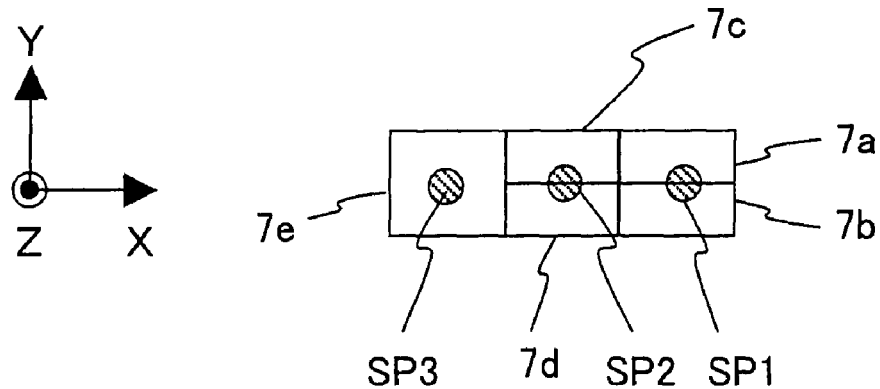
FIG. 4(a) is an explanatory view illustrating a condensed state of a condensed light spot on a light detector under the condition where no focal point deviation and spherical aberration occur.
Figure 4B:
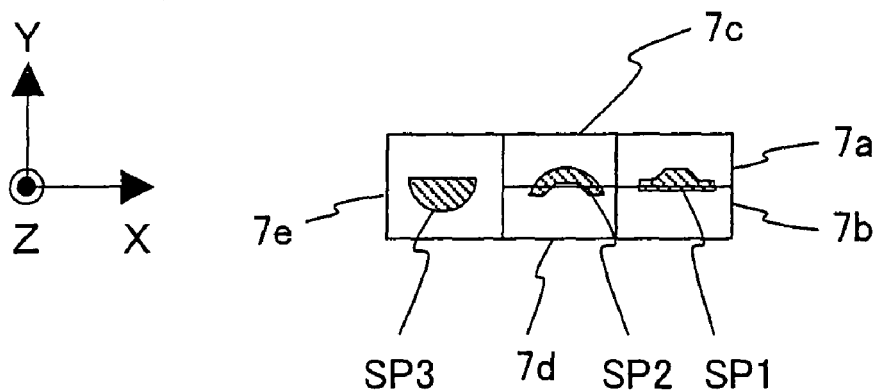
FIG. 4(b) is an explanatory view illustrating a condensed state of a condensed light spot on the light detector under the condition where focal point deviation occurs without the occurrence of spherical aberration.
Figure 4C:
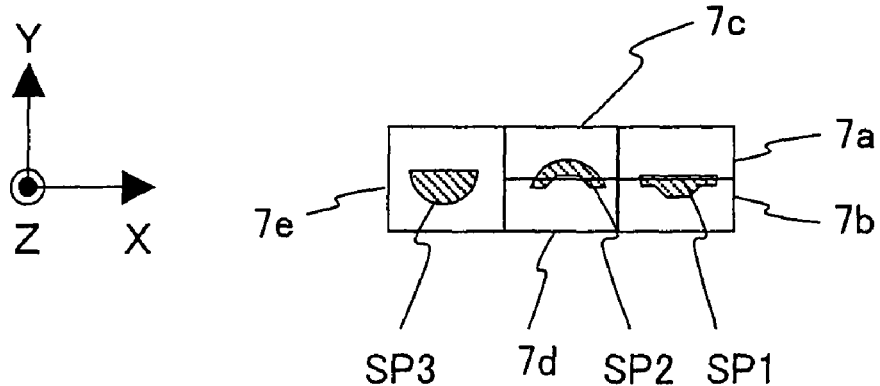
FIG. 4(c) is an explanatory view illustrating a condensed state of a condensed light spot on the light detector under the condition where spherical aberration occurs without the occurrence of focal point deviation.

FIGS. 4(a) through 4(c) are plan views illustrating the structure of the light detector 7 included in the optical pickup device 11. As illustrated in FIGS. 4(a) through 4(c), the light detector 7 is constituted of five light receiving sections 7a through 7e.

The light receiving sections 7a through 7e are provided in line with the regions of the hologram element 2 in such a manner that among light beams reflected by the information recording layer 6c or 6d of the optical disk 6, positive first order diffracted light (first light beam) of the light beam having passed through the first region 2a of the hologram element 2 forms a condensed light spot SP1 on the border between the light receiving sections 7a and 7b, positive first order diffracted light (second light beam) of the light beam having passed through the second region 2b forms a condensed light spot SP2 on the border between the light receiving sections 7c and 7d, and positive first order diffracted light of the light beam having passed through the third region 2c forms a condensed light spot SP3 in the light receiving section 7e. Thus, each of the first light beam and the second light beam is received by separate light receiving sections.

The light beams received by the light receiving sections 7a through 7e of the light detector 7 are converted into electric signals Sa through Se. The electric signals Sa through Se are supplied to the control circuit 59 (see FIG. 2) to be used for detection and adjustment (correction) of focal point deviation of the objective lens 4 and detection and adjustment (correction) of spherical aberration. That is, the control circuit 59 serves as (a) focal point deviation detecting means for detecting the focal point deviation and (b) (spherical) aberration detecting means which detects the spherical aberration.

The electric signals Sa through Se from the light receiving sections 7a through 7e of the light detector 7 are supplied to the information reproducing circuit 60, for example, to be converted into a reproduction signal RF. The reproduction signal RF recorded on the optical disk 6 is the sum total of the electric signals Sa through Se outputted from the light receiving sections 7a through 7e of the light detector 7, as expressed by the following equation:

$$RF=Sa+Sb+Sc+Sd+Se$$

The following will describe detection of the focal point deviation and correction thereof using the electric signals Sa through Se. The following description assumes that the focal point deviation in a case where the amount of spherical aberration of the objective lens 4 is negligible small is detected using the electric signals Sa through Se to be corrected.

The FES for detecting the focal point deviation is generated by a known technique called knife edge method by the following equation:

$$FES=(Sa-Sb)+(Sc-Sd)$$

For convenience of explanation, Sa−Sb is referred to as a first output signal, and Sc−Sd is referred to as a second output signal. The following will discuss how the FES is detected.

Assume that a light beam is in focus on either one of the information recording layers 6c and 6d of the optical disk 6, i.e. a light beam is not out of focus on the information recording layer 6c or 6d. In this case, as illustrated in FIG. 4(a), the condensed light spot SP1 is formed on the border between the light receiving section 7a and the light receiving section 7b in such a manner that the amount of light received by the light receiving section 7a is equal to the amount of light received by the light receiving section 7b. Therefore, the first output signal Sa−Sb is zero. In the meanwhile, as illustrated in FIG. 4(a), the condensed light spot SP2 is formed on the border between the light receiving section 7c and the light receiving section 7d in such a manner that the amount of light received by the light receiving section 7c is equal to the amount of light received by the light receiving section 7d. Therefore, the second output signal (Sc−Sd) is also zero. Accordingly, the FES is zero.

Now, assume that a light beam is out of focus on the information recording layer 6c or 6d when the optical disk 6 approaches or moves away from the objective lens 4. In this case, as illustrated in FIG. 4(b), the condensed light spots SP1 and SP2 defocus and change their shapes from the shapes illustrated in FIG. 4(a) to the shapes illustrated in FIG. 4(b). On this account, values reflecting the focal point deviations (nonzero values) are outputted as the first output signal Sa−Sb and the second output signal Sc−Sd. The FES therefore has a nonzero value reflecting the focal point deviation.

In view of this, to always keep a focal point on the information recording layer, i.e. to correct the focal point deviation, the objective lens 4 is moved in a direction of the optical axis OZ so that output (value) of the FES is always zero.

The following will describe detection and correction of spherical aberration caused. Assume that spherical aberration occurs on the objective lens 4 while no focal point deviation occurs in the optical system of the optical pickup device 11. The spherical aberration occurs (i) due to the change in thickness of the cover glass 6a of the optical disk 6, and (ii) at the time of interlayer jump between the information recording layers 6c and 6d (FIG. 3).

For example, when spherical aberration occurs due to the change in thickness of the cover glass 6a (FIG. 3), a focal point of a light beam (point at which a diameter of the light beam is smallest) is different between a light beam near the optical axis OZ of the bundle of light beams and a light beam near the periphery of the bundle of light beams.

Therefore, (a) a value of the first output signal Sa−Sb indicative of the amount of focal point deviation of a light beam (first light beam) near the optical axis OZ of the bundle of light beams (near the inner portion of the bundle of light beams) when the first region 2a of the hologram element 2 diffracts a light beam near the optical axis OZ of the bundle of light beams and (b) a value of the second output signal Sc−Sd indicative of the amount of focal point deviation of a light beam (second light beam) near the periphery of the bundle of light beams when a light beam near the periphery of the bundle of light beams is diffracted are not zero, and hence are values respectively reflecting the amounts of spherical aberration.

In the inner portion of the bundle of beams and the outer portion of the bundle of beams, focal point deviation caused by the occurrence of spherical aberration occurs in opposite directions. On this account, the SAES with higher absolute value of sensitivity is detected by obtaining a difference signal between the first output signal Sa−Sb and the second output signal Sc−Sd. Therefore, the SAES is obtained by the following equation:

$$SAES=(Sa-Sb)-k\times(Sc-Sd) \quad (2)$$

where k is a coefficient. Now, how the SAES is detected is discussed.

First, a case where no spherical aberration occurs is discussed first. In this case, as illustrated in FIG. 4(a), the condensed light spot SP1 is formed on the border of the light receiving section 7a and the light receiving section 7b in such a manner the amount of light received by the light receiving section 7a is equal to the amount of light received by the light receiving section 7b. Therefore, the first output signal Sa−Sb is zero. In the meanwhile, the condensed light spot SP2 is formed on the border of the light receiving section 7c and the light receiving section 7d in such a manner the amount of light received by the light receiving section 7c is equal to the amount of light received by the light receiving section 7d. Therefore, the second output signal Sc−Sd is also zero. That is, the condensed light spot SP1 and the condensed light spot SP2 are in condensed state (focused state). Therefore, the SAES is zero.

Now, a case where spherical aberration occurs is discussed. As illustrated in FIG. 4(c), although focal point deviation does not occur, the condensed light spots SP1 and SP1 change their condensed states to defocused states.

As a result, the first output signal Sa−Sb and the second output signal Sc−Sd indicate nonzero values. Also, since defocusing (focal point deviation) occurs in opposite directions between the condensed light spots SP1 and SP2, the SAES with high sensitivity is detected by substituting a difference signal between these signals (first output signal Sa−Sb and second output signal Sc−Sd) in the above equation 2.

Further, a case where spherical aberration occurs with slight focal point deviation remained in the optical system of the optical pickup device 11. In this case, the condensed light spots SP1 and SP2 are in defocused states due to the focal point deviation even when no spherical aberration occurs. Therefore, the first output signal Sa−Sb and the second output signal Sc−Sd indicate nonzero values. If the amount of focal point deviation is small, changes in the first output signal Sa−Sb and the second output signal Sc−Sd are almost linear. It is therefore possible to eliminate the influence of the focal point deviation on the SAES, by optimizing a coefficient k.

Defocusing (focal point deviation) caused by spherical aberration occurs in opposite directions between the condensed light spots SP1 and SP2. On this account, the SAES is outputted even if a coefficient k is optimized.

Note that a magnitude of an absolute value of detection sensitivity of the SAES changes according to a division manner of the hologram element, as will be described later.

Conventionally, there was no hologram element that satisfies both (i) little variation in detection sensitivity of the SAES and (ii) a high absolute value of detection sensitivity of the SAES (high detection sensitivity of the SAES). The following will explain (i) and (ii), and then the effect of values of a specific division pattern of the aforementioned hologram element 2 (h1=0.3r1, h2=0.6r1, θ=±45 deg, l1=0.6 r1; see FIG. 1)

In order to condense light beams on a track which is formed on the information recording layer 6c or the information recording layer 6d of the optical disk 6, the optical pickup device 11 practically performs tracking control in which the objective lens 4 is moved in the radial direction of the optical disk 6 so that light beams are condensed on the track all the time. The tracking control does not give rise to any problem when the hologram element 2 and the objective lens 4 are combined in one unit. This is because the center of the bundle of light beams matches the center of the hologram element 2. However, the tracking control gives rise to the problem that the center of the bundle of light beams does not match the center of the hologram element 2 when the hologram element 2 and the objective lens 4 are separately included in the optical pickup 10.

Figure 15:
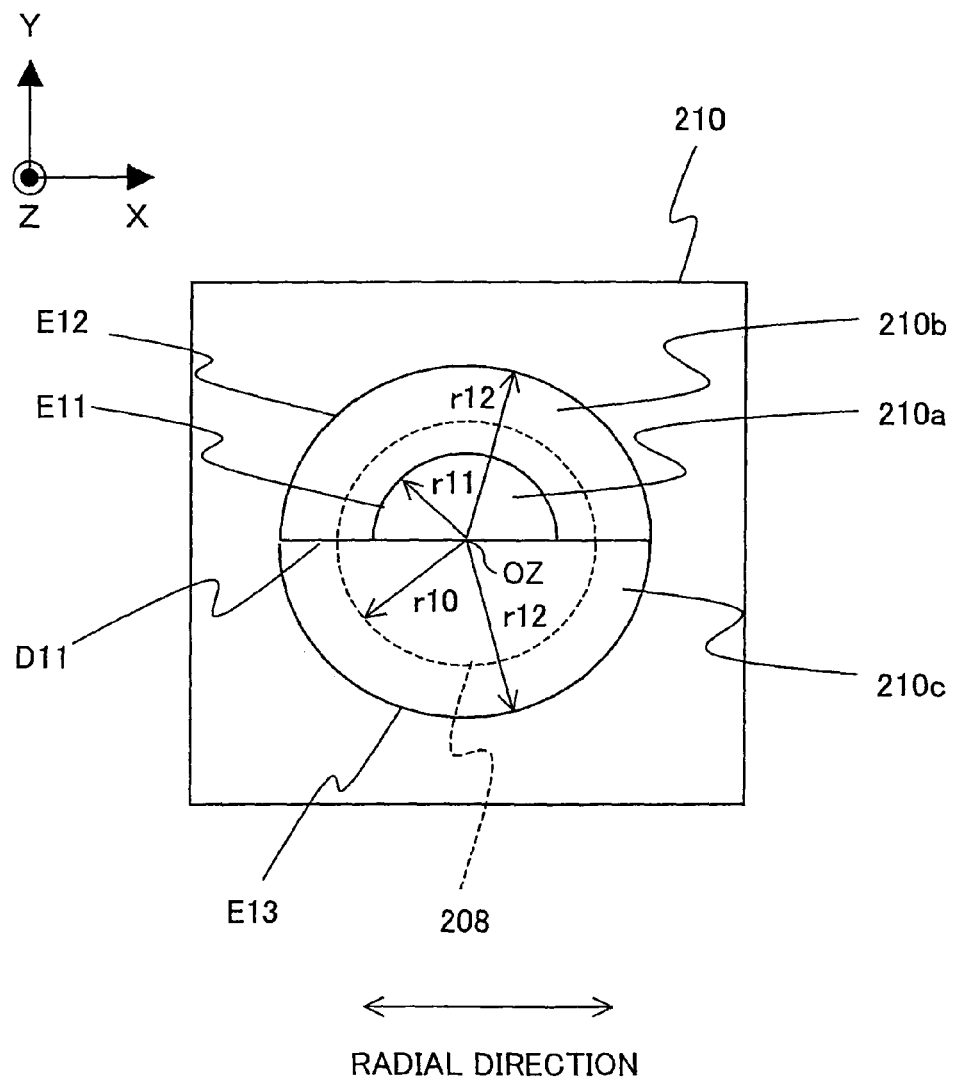
FIG. 15 is an explanatory view illustrating details of a hologram element of an optical pickup device in the first conventional example.

In the case of the hologram element 210 having divisions in the conventional division manner as illustrated in FIG. 15, when the tracking control causes displacement between the center of the bundle of light beams and the center of the hologram element 2 in the radial direction, some light beams thereof that are supposed to be diffracted by the region 210a or the region 210b of the hologram element 210 are diffracted by respectively different regions.

That is, some light beams that are supposed to be diffracted by the region 210a of the hologram element 210 are diffracted by the region 210b, while some light beams that are supposed to be diffracted by the region 210b of the hologram element 210 are diffracted by the region 210a. Accordingly, the light beam diffracted by each of the regions enters a light receiving section that is not supposed to receive the light beam.

On this account, an electric signal supplied from each light receiving section of the light detector varies depending upon whether there is displacement between the center of the bundle of light beams and the center of the hologram element 210 in the radial direction. Therefore, even when the amount of spherical aberration is constant, the SAES varies depending on the amount of displacement between the center of the bundle of light beams and the center of the hologram element 210. This gives rise to the problem that proper correction is impossible even if spherical aberration is corrected on the basis of the SAES. In order to reduce the influence of the center (optical axis) of the bundle of light beams displaced in the radial direction of the optical disk 6 on the SAES to a minimum, the hologram element should be divided in the division manner using a line parallel to the radial direction.

Figure 16:
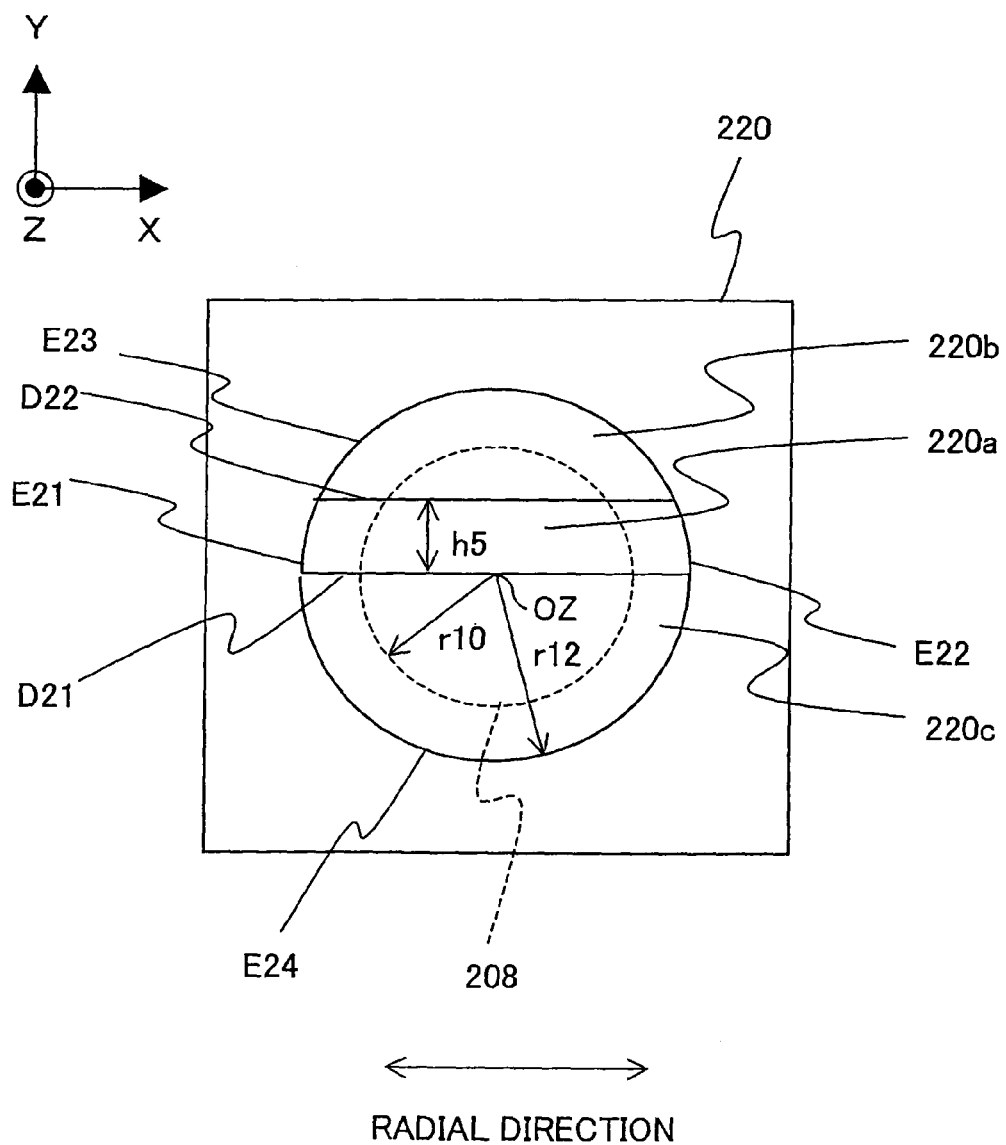
FIG. 16 is an explanatory view illustrating details of a hologram element of an optical pickup device in the second conventional example.

In view of this, the hologram element 220 having divisions in division manner as illustrated in FIG. 16 was used in the past to reduce the influence of the optical axis OZ displaced in the radial direction of the optical disk 6 on the SAES to a minimum (to reduce variation of detection sensitivity of the SAES). As described in the section of [BACKGROUND ART], the hologram element 220 has regions divided by the line D22 extending in the radial direction. On this account, even when there is displacement between the center of the bundle of light beams and the center of the hologram element 220 in the radial direction, light beams that are supposed to be diffracted by the region 220a and the region 220b of the hologram element 220 are not diffracted by different regions.

Figure 5A:
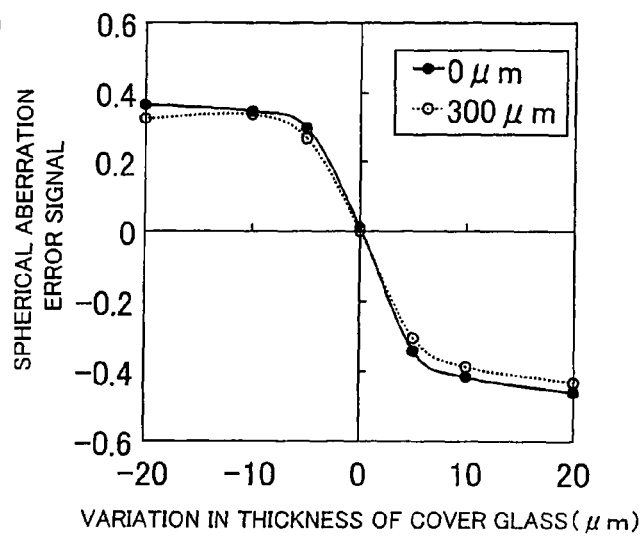
FIG. 5(a) is a graph showing relations between the SAES obtained by an optical pickup device including the hologram element illustrated in FIG. 1 and variation in thickness of a cover glass of an optical disk, in a case where no objective lens shifting occurs and a case where objective lens shifting occurs.

Now, FIG. 5(a) illustrates a graph showing relations between the SAES obtained in a case where the hologram element 2 of the present invention is used and variation in thickness of the cover glass 6a of the optical disk 6. As comparative examples, FIGS. 5(b) and 5(c) illustrate graphs respectively showing relations between the SAES obtained in a case where the hologram element 210 as illustrated in FIG. 15 is used and variation in thickness of the cover glass 6a of the optical disk 6 and relations between the SAES obtained in a case where the hologram element 220 as illustrated in FIG. 16 is used and variation in thickness of the cover glass 6a of the optical disk 6.

Assume that (division) radius r11 of the hologram element 210 is r11=0.7r10 where radius r10 is an effective radius of the bundle of light beams 208. Further, assume that distance h5 between the line D22 and the line D21 in the hologram element 220 is h5=0.6r10. Still further, assume that the position h1 of a division line (line D3) of the hologram element 2 of the present invention (distance from the line D1) is h1=0.3r1, and the distance h2 between a division line (line D4) of the hologram element 2 and the line D1 is h2=0.6r1.

Figure 5B:
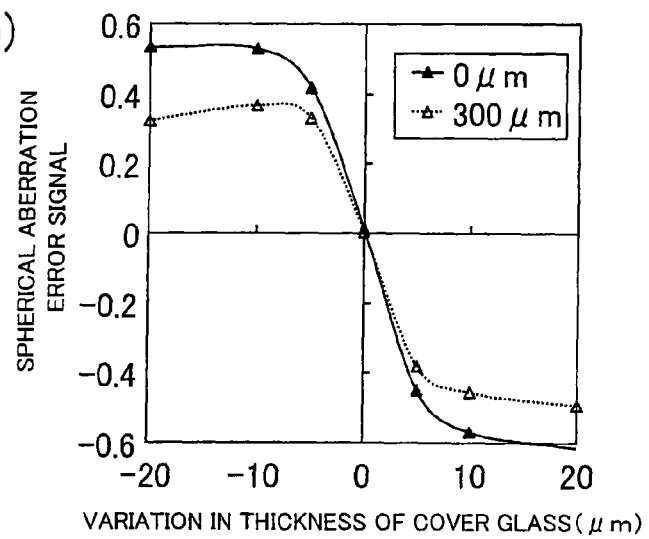
FIG. 5(b) is a graph showing relations between the SAES obtained by an optical pickup device including a hologram element as a first conventional example illustrated in FIG. 15 and variation in thickness of a cover glass of an optical disk, in a case where no objective lens shifting occurs and a case where objective lens shifting occurs.
Figure 5C:
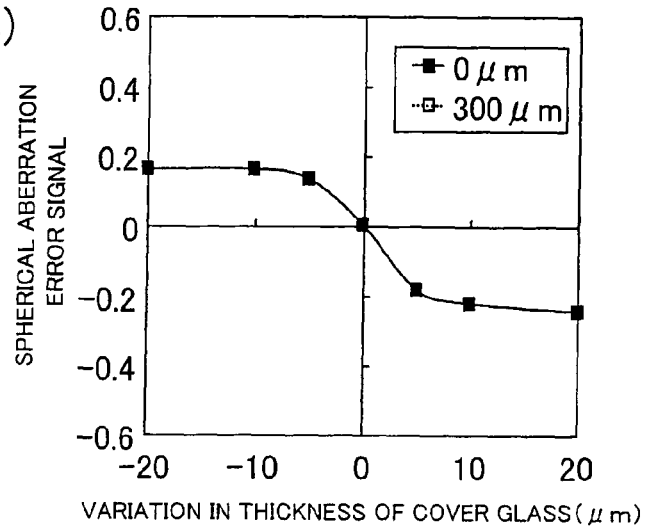
FIG. 5(c) is a graph showing relations between the SAES obtained by an optical pickup device including the conventional hologram element illustrated in FIG. 16 and variation in thickness of a cover glass of an optical disk, in a case where no objective lens shifting occurs and a case where objective lens shifting occurs.

Each of the graphs illustrated in FIGS. 5(a) through 5(c) shows a relation between variation in thickness of the cover glass 6a and the SAES obtained when there is no displacement between the center of the hologram element 2, 210, or 220 and the center of the bundle of light beams, i.e. when the amount of displacement is 0 μm, and a relation between varuatuib in thickness of the cover glass 6a and the SAES obtained when the tracking control causes displacement of 300 μm in the radial direction between the center of the hologram element 2, 210, or 220 and the center of the bundle of light beams. An effective radius of the bundle of light beams determined by the aperture of the objective lens 4 is 1.5 mm. Therefore, 300 μm corresponds to 20% of the effective radius thereof.

As is apparent from the graphs illustrated in FIGS. 5(a) and 5(c), the displacement of 300 μm between the hologram elements 2 and 200 and the center of the bundle of light beams has little influence on the SAES, in a case where light beams are divided by the division lines of the hologram element 2 and in a case where light beams are divided by the division lines of the hologram element 220.

However, as illustrated in FIG. 5(b), it is apparent that the displacement between the center of the hologram element 210 and the center of the bundle of light beams has influence on the SAES, in a case where light beams are divided by the division line (first semicircle E11) of the hologram element 210.

As illustrated in FIG. 1, the hologram element 2 of the present embodiment has regions divided by the lines other than the lines (both ends; lines D3) that constitute the protrusion part 44 and by the line D5 located at the top of the protrusion part 44, which lines D3 and D5 are parallel to the radial direction. On this account, it is apparent that diffraction of light beams by different regions less occurs and there is little variation in detection sensitivity of the SAES even when shifting of the objective lens by tracking control causes displacement between the center of the hologram element 2 and the center of the bundle of light beams (see FIG. 5(a)).

As a result of this, it is apparent that the hologram element 2 and the hologram element 220 in which the regions are divided by lines in the radical direction are excellent in little variation of detection sensitivity of the SAES.

However, the hologram element 220 brings a low absolute value of detection sensitivity of the SAES because the division manner of the hologram element 220 is greatly different from the division manner which brings a maximum absolute value of detection sensitivity of the SAES (division manner of the hologram element 210).

As compared in absolute value of detection sensitivity of the SAES between the hologram elements 2, 210, and 220, the following is apparent from FIGS. 5(a) through 5(c).

In a case where light beams are divided by the division line of the hologram element 210, an absolute value of detection sensitivity of the SAES becomes maximum. This is because light beams are divided by the arc E11 of the circle centered about the optical axis OZ (circle having a radius r11 that is approximately 70% of the effective radius r10 of the bundle of light beams 208 determined by the aperture of the objective lens), so that maximum focal point deviation of divided light beams can be detected.

On the contrary, in a case where light beams are divided by the division lines of the hologram element 220, an absolute value of detection sensitivity of the SAES is only about one-third the absolute value of detection sensitivity of the SAES obtained by the hologram element 210, as shown in FIGS. 5(b) and 5(c). This is because the division manner of the hologram element 220 is greatly different from that of the hologram element 210.

Meanwhile, in a case where light beams are divided by the division lines of the hologram element 2, an absolute value of detection sensitivity of the SAES is lower than the absolute value of detection sensitivity of the SAES obtained by the hologram element 210. However, the absolute value of detection sensitivity of the SAES obtained by the hologram element 2 is about twice larger than the absolute value of detection sensitivity of the SAES obtained by the hologram element 220, as shown in FIGS. 5(a) and 5(b). This is because the division manner of the hologram element 2 is close to that of the hologram element 210.

The division manner of the hologram element 2 is close to that of the hologram element 210 because the division line D2 has the protrusion part 44 at its center part which protrusion part 44 bulges toward the periphery of the hologram element, as illustrated in FIG. 1. Because of the protrusion part 44 arranged in this manner, the bundle of light beams are divided into a light beam near the optical axis OZ of the bundle of light beams and a light beam near the periphery of the bundle of light beams, with the division manner close to that of the hologram element 210. Therefore, it is possible to detect the SAES whose absolute value of sensitivity is large.

In other words, the division manner of the hologram element 2 is similar to that of the hologram element 210 because, as illustrated in FIG. 1, the division line D2 has the pair of line segments D4 which are inclined toward the line D8 from end points (first end points) A of the lines D3 on the optical axis OZ side and extend away from the line D1, in such a manner so as to be axially symmetric to the line D8.

Since the division line D2 includes the line segments D4 inclined toward the line D8, the hologram element 2 has a division pattern which forms similar to the first semicircle E11 centered about the optical axis OZ (see FIG. 15). Therefore, it is possible to detect the SAES with a high absolute value of sensitivity.

From the above, it is obvious that the hologram element 2 of the present invention satisfies (i) the condition where there is little variation in detection sensitivity of the SAES and (ii) the condition where an absolute value of detection sensitivity of the SAES is high.

From the graphs illustrated in FIGS. 5(a) through 5(c), it is apparent that in order to satisfy the conditions (i) and (ii), it is necessary to divide a hologram element by a line parallel to the radial direction and by a division line similar to the division line of the hologram element 210.

In order to make the division line of the hologram element 2 similar to the division line of the hologram element 210, it is desirable that h1=0.3r1, h2=0.6r1, e=±45 deg, and l1=0.6r1 where r1 is an effective radius of the bundle of light beams determined by the aperture of the objective lens 4 on the aforementioned hologram element 2. As a result of comparison in appearance between FIG. 1 and FIG. 15, it is apparent that setting to these numerical values makes the division line of the hologram element 2 similar to the division line of the hologram element 210. The reason why these numerical values are desirable will be described using an experimental example.

Figure 6A:
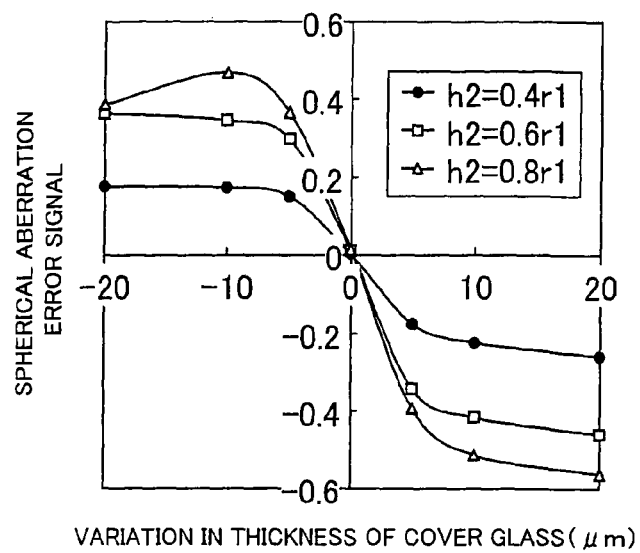
FIG. 6(a) is a graph showing relations between the SAES obtained when a hologram element having a distance h2 illustrated in FIG. 1 of 0.4r1, 0.6r1, and 0.8r1 is used and the variation in thickness of a cover glass of an optical disk.

FIG. 6(a) is a graph showing relations between the SAES and the variation in thickness of the cover glass 6a of the optical disk 6 when the distance h2 illustrated in FIG. 1 is 0.4r, 0.6r, and 0.8r. As illustrated in FIG. 6(a), an absolute value of detection sensitivity of the SAES obtained when the distance h2 is 0.4r1 is lower than that of the SAES obtained when the distance h2 is 0.6r1 and 0.8r1.

Figure 6B:
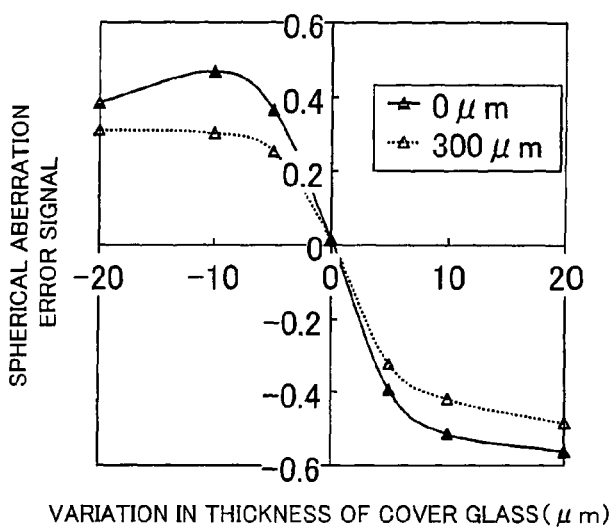
FIG. 6(b) is a graph showing relations between the SAES obtained when a hologram element having a distance h2 illustrated in FIG. 1 of 0.8r1 is used and the variation in thickness of a cover glass of an optical disk, in a case where no objective lens shifting occurs and a case where objective lens shifting occurs.

FIG. 6(b) shows a relation between the SAES and the variation in thickness of the cover glass when the distance h2 is 0.8r1 and there is no displacement between the center of the hologram element 2 and the center of the bundle of light beams and a relation therebetween when the distance h2 is 0.8r1 and tracking control causes displacement of 300 μm in the radial direction of the optical disk 6 between the center of the hologram element 2 and the center of the bundle of light beams.

As compared with the case where the distance h2 is 0.6r1 as illustrated in FIG. 5(a), in a case where the distance h2 is 0.8r1, the displacement between the center of the hologram element 2 and the center of the bundle of light beams has significant influence (causes significant change) on detection sensitivity of the SAES. As a result of this, it is obvious that the distance h2 is preferably 0.6r1 in terms of (a) the magnitude of the absolute value of detection sensitivity of the SAES and (b) the variation in detection sensitivity of the SAES.

Figure 7:
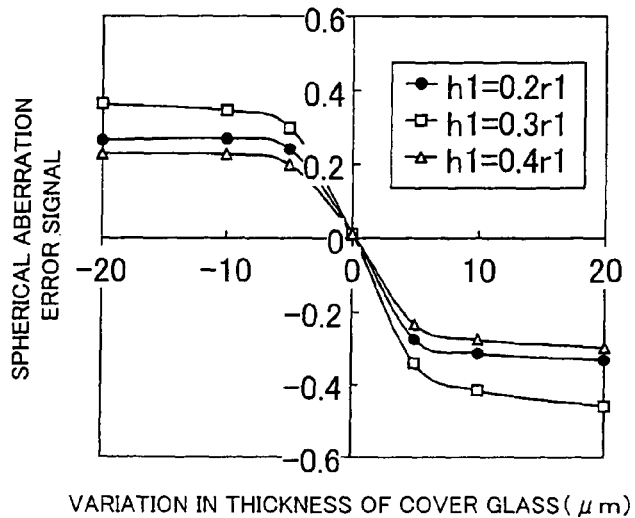
FIG. 7 is a graph showing relations between the SAES obtained when a hologram element having a distance h1 illustrated in FIG. 1 of 0.2r1, 0.3r1, and 0.4r1 is used and the variation in thickness of a cover glass of an optical disk.

FIG. 7 is a graph showing relations between the SAES and the variation (μm) in thickness of the cover glass of the optical disk when the distance h1 illustrated in FIG. 1 is 0.2r1, 0.3r1, and 0.4r1. As illustrated in FIG. 7, the absolute value of detection sensitivity of the SAES obtained when the distance h1 is 0.2r1 and 0.4r1, is lower than that of the SAES obtained when the distance h1 is 0.3r1. As a result of this, it is obvious that the distance h1 is desirably 0.3r1.

Figure 8A:
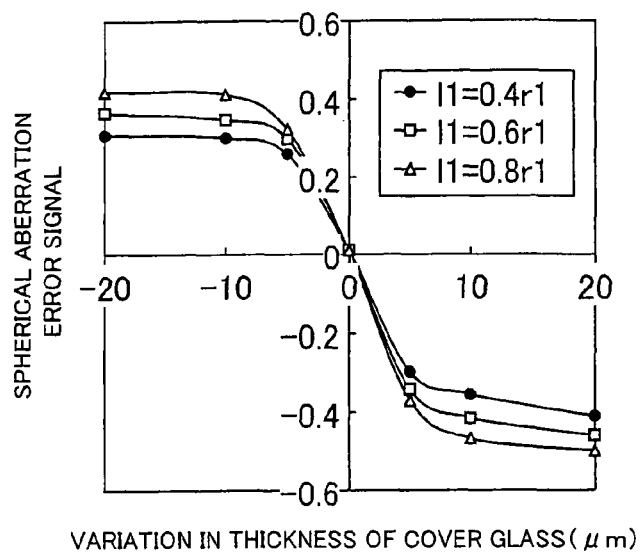
FIG. 8(a) is a graph showing relations between the SAES obtained when a hologram element having a length l1 illustrated in FIG. 1 of 0.4r1, 0.6r1, and 0.8r1 is used and the variation in thickness of a cover glass of an optical disk.

FIG. 8(a) is a graph showing relations between the SAES and the variation (μm) in thickness of the cover glass of the optical disk when the length l1 illustrated in FIG. 1 is 0.4r1, 0.6r1, and 0.8r1.

As is apparent from FIG. 8(a), the absolute value of detection sensitivity of the SAES decreases when the length l1 is 0.8r1, 0.6r1, and 0.4r1 in this order. Therefore, the length l1 is preferably 0.8r1 or 0.6r1 in terms of the absolute value of detection sensitivity of the SAES.

Figure 8B:
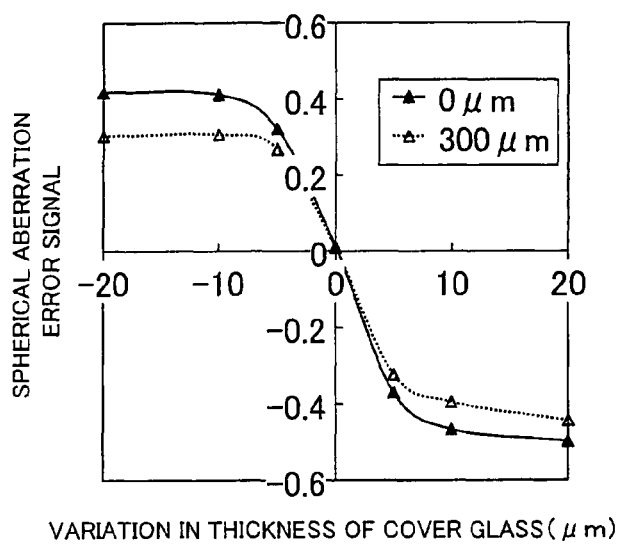
FIG. 8(b) is a graph showing relations between the SAES obtained when a hologram element having a length l1 of 0.8r1 is used and the variation in thickness of a cover glass of an optical disk, in a case where no objective lens shifting occurs and a case where objective lens shifting occurs.

Further, FIG. 8(b) is a graph showing a relation between the SAES and the variation (μm) in thickness of the cover glass when the length l1 is 0.8r and there is no displacement between the center of the hologram element 2 and the center of the bundle of light beams and a relation therebetween when the length l1 is 0.8r and tracking control causes displacement of 300 μm in the radial direction of the optical disk 6 between the center of the hologram element 2 and the center of the bundle of light beams.

As compared with the case illustrated in FIG. 5(a) where the length l1 is 0.6r1, in the case of the hologram element 2 having the length l1 of 0.8r1, the displacement of the center of the bundle of light beams has significant influence (causes significant change) on detection sensitivity of the SAES, as illustrated in FIG. 8(b). As a result of this, it is obvious that the length l1 is desirably 0.6r.

Figure 9:
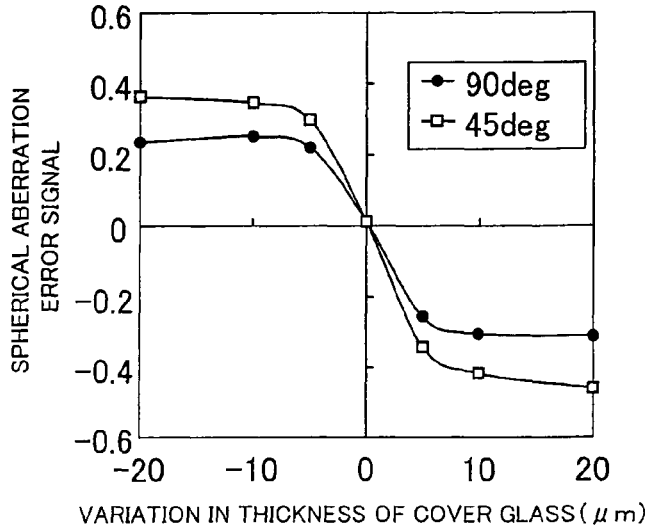
FIG. 9 is a graph showing relations between the SAES obtained when a hologram element having an inclination angle θ illustrated in FIG. 1 of ±45 deg and ±90 deg is used and the variation in thickness of a cover glass of an optical disk.

FIG. 9 is a graph showing relations between the SAES and the variation (μm) in thickness of the cover glass of the optical disk when the inclination angle θ shown in FIG. 1 is ±45 deg and ±90 deg. As is apparent from FIG. 9, the absolute value of detection sensitivity of the SAES is high when the inclination angle θ shown in FIG. 1 is ±45 deg. Therefore, it is obvious that the inclination angle θ is desirably ±45 deg.

In the present embodiment, the hologram element 2 is used as means for guiding to the light detector 7 light beams reflected on the information recording layer 6c or 6d of the optical disk 6. However, this is not the only possibility. For example, the guiding means may be a combination of a beam splitter and a wedge prism. That is, the condensing optical system of the present invention is not limited to the hologram element 2. However, the hologram element 2 is preferably used in consideration of the downsizing of the device.

In the present embodiment, the collimator lens 3 is driven as the spherical aberration correcting mechanism. However, a mechanism that adjusts a distance between two lenses constituting a beam expander (not shown) disposed between the collimator lens 3 and the objective lens 4 may be adopted. That is, the spherical aberration correcting mechanism may be the mechanism that adjusts a distance between two lenses constituting a beam expander.

The above description has discussed a hologram element laser in which the light source is integrated with the light detector. As will be described later, the following arrangement may be alternatively adopted: an independent semiconductor laser is used as a light source, a light path is divided by a PBS, and reflected light of the PBS is supplied to a light detector. In this case, light beam dividing means is provided in the part of an optical system which handles reflected light from the optical disk 6.

Figure 10:
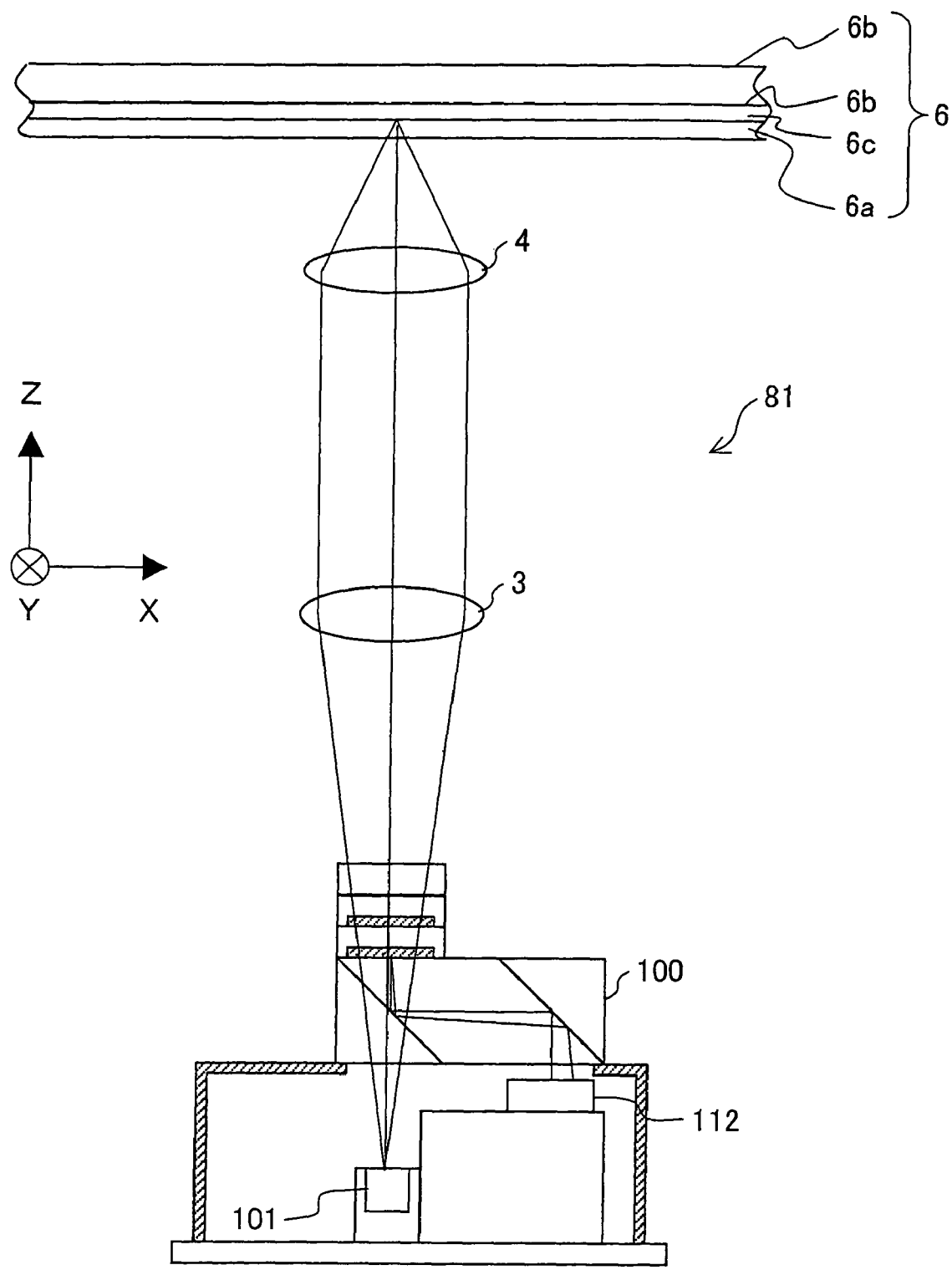
FIG. 10 is an explanatory view illustrating a general configuration of an optical pickup device which includes an optical integrated unit.

The aforementioned aberration detection device of the present invention is applicable to an optical pickup device including an optical integrated unit. FIG. 10 is an explanatory view illustrating a general configuration of an optical pickup 81 which includes an optical integrated unit 100. A drive control section for controlling the operation of the optical pickup 81 is the same as the drive control section 51 for controlling the operation of the optical pickup 10, and explanation thereof is omitted.

The optical pickup 81 illustrated in FIG. 10 includes the optical integrated unit 100, a collimator lens 3, and an objective lens 4.

In FIG. 10, light beams emitted from a light source (semiconductor laser) 101 which is included in the optical integrated unit 100 are converted into parallel light beams by the collimator lens 3, travel through the objective lens 4, and then condensed onto and reflected from the optical disk 6. The reflected light beams (hereinafter referred to as "return light") travel again through the objective lens 4 and the collimator lens 3, and are received by a light detector 112 which is included in the optical integrated unit 100.

Figure 11A:
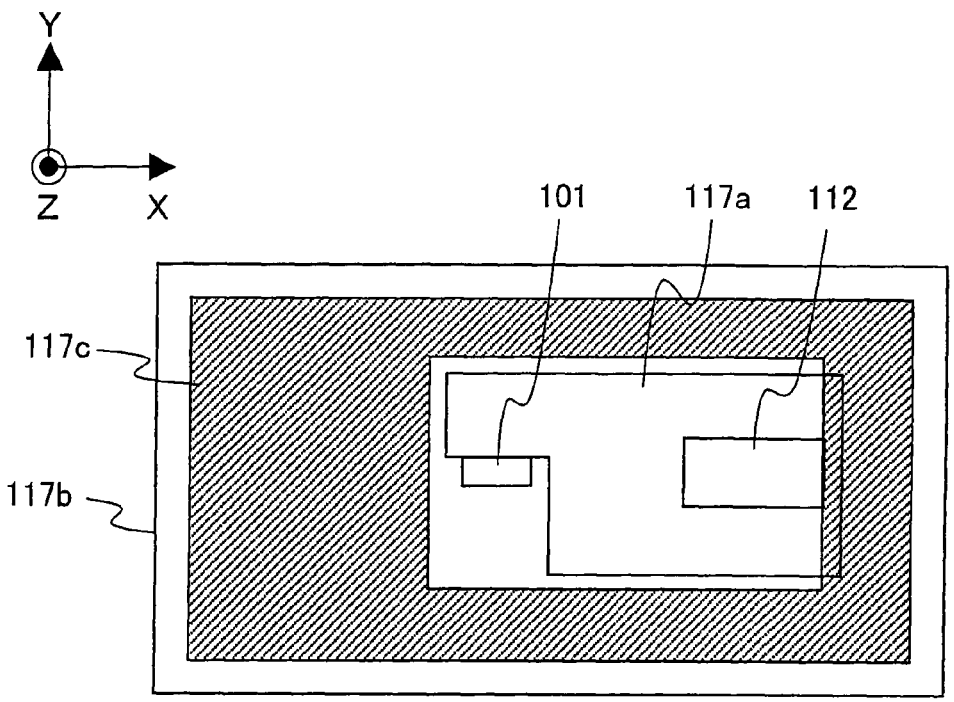
FIG. 11(a) is a cross-sectional view illustrating a general configuration of the optical integrated unit illustrated in FIG. 10.
Figure 11B:
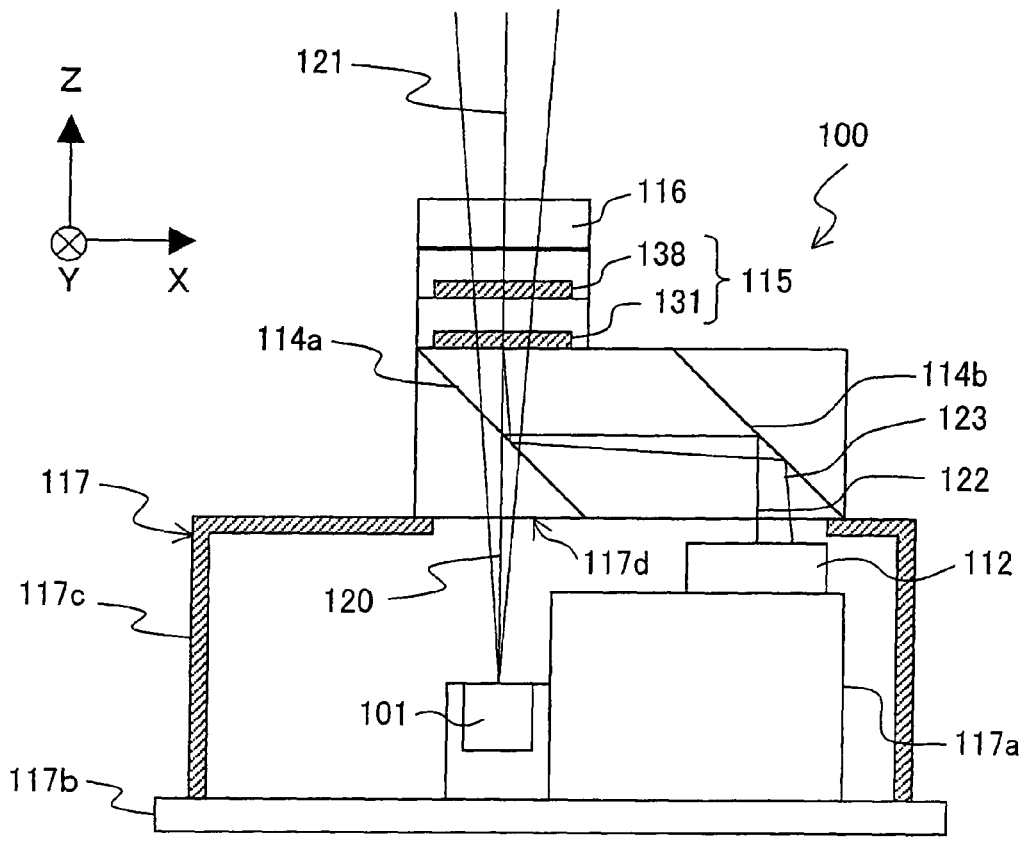
FIG. 11(b) is a cross-sectional view illustrating a general configuration of the optical integrated unit illustrated in FIG. 10.

FIGS. 11(a) and 11(b) are views illustrating the structure of the optical integrated unit 100 illustrated in FIG. 10. FIG. 11(a) is a plan view of the optical integrated unit 100 illustrated in FIG. 10 when viewed from an optical axis direction (z direction). FIG. 11(b) is a side view of the optical integrated unit 100 illustrated in FIG. 10 when viewed from a y direction.

As illustrated in FIG. 11(b), the optical integrated unit 100 includes the semiconductor laser 101, the light detector 112, a polarized beam splitter 114, a polarization/diffraction element 115, a ¼ wavelength plate 116, and a package 117.

The package 117 is made up of a stem 117a, a base 117b, and a cap 117c. The cap 117c has a window 117d through which light passes. In the package 117, there are provided the semiconductor laser 101 and the light detector 112.

FIG. 11(a) is a plan view of the package 117 when viewed from the optical axis direction (z direction) shown in FIG. 11(b) (i.e. from the window 117d of the cap 117c) to show the locations of the semiconductor laser 101 and the light detector 112 in the package 117.

For simplicity, the polarized beam splitter 114, the polarization/diffraction element 115, and the ¼ wavelength plate 116 are omitted in FIG. 11(a).

As illustrated in FIG. 11(a), the light detector 112 is mounted on the stem 117a, and the semiconductor laser 101 is provided on the side of the stem 117a. In order to secure a light path of the light beams 120 emitted from the semiconductor laser 101 and a light path of return light (non-diffracted light 122 and first-order diffracted light 123) received by the light detector 112, and a light beam emitting section of the semiconductor laser 101 and a light receiving section of the light detector 112 are disposed in such a manner so as to be included in the region of the window 117d of the cap 117c.

Next, the locations of the members will be described with reference to FIG. 11(b). For convenience of explanation, the following description assumes that a surface of the polarized beam splitter 114 which the light beams 120 emitted from the semiconductor laser 101 enter is referred to as a light beam entrance surface of the polarized beam splitter 114, and a surface of the polarized beam splitter 114 which the return light enters is referred to as a return light entrance surface of the polarized beam splitter 114. Further, the following description assumes that a surface of the polarization/diffraction element 115 which the light beams 120 emitted from the semiconductor laser 101 enter is referred to as a light beam entrance surface of the polarization/diffraction element 115, and a surface of the polarization/diffraction element 115 which the return light enters is referred to as a return light entrance surface of the polarization/diffraction element 115.

As illustrated in FIG. 11(b), the polarized beam splitter 114 is disposed on the package 117. More specifically, the polarized beam splitter 114 is disposed on the package 117 in such a manner that the window 117d is covered with the light beam entrance surface of the polarized beam splitter 114.

The polarization/diffraction element 115 is disposed on the optical axis of the light beams 120 emitted from the semiconductor laser 101, in such a manner that the light beam entrance surface of the polarization/diffraction element 115 faces the return light entrance surface of the polarized beam splitter 114.

The semiconductor laser 101 is the one that emits light beams 120 of a wavelength λ of 405 nm. The light beams 120 are linearly polarized light (P-polarized light) having a polarized light oscillation surface in the x direction with respect to the optical axis direction (z direction) shown. The light beams 120 emitted from the semiconductor laser 101 enter the polarized beam splitter 114.

The polarized beam splitter 114 has a polarized beam splitter (PBS) surface (function surface) 114a and a reflection mirror (reflection surface) 114b.

The PBS surface 114a transmits linearly polarized light (P-polarized light) having a polarized light oscillation surface in the x direction with respect to the optical axis direction (z direction) shown, and the PBS surface 114a has a polarized light oscillation surface which is perpendicular to the polarized light oscillation surface. That is, the PBS surface 114a has characteristics of reflecting linearly polarized light (S-polarized light) having a polarized light oscillation surface in the y direction with respect to the optical axis direction (z direction) shown.

The PBS surface 114a is disposed on the optical axis of the light beams 120 having P-polarized light and emitted from the semiconductor laser 101, in such a manner that the light beams 120 pass through the PBS surface 114a. The reflection mirror 114b is disposed in parallel to the PBS surface 114a.

The light beams 120 (P-polarized light) that have entered the PBS surface 114a pass through the PBS surface 114a as they are. Then, the light beams 120 that have passed through the PBS surface 114a enter the polarization/diffraction element 115.

Next, the following will describe details of the polarization/diffraction element 115. The polarization/diffraction element 115 is constituted by a first polarization hologram element 131 and a second polarization hologram element (light beam dividing means) 138.

The first polarization hologram element 131 and the second polarization hologram element 138 are disposed on the optical axis of the light beams 120, in such a manner that a distance from the first polarization hologram element 131 to the semiconductor laser 101 is shorter than a distance from the second polarization hologram element 138 to the semiconductor laser 101.

The first polarization hologram element 131 diffracts P-polarized light to transmit S-polarized light, whereas the second polarization hologram element 138 diffracts S-polarized light to transmit P-polarized light. The polarized light beams are diffracted by a groove structure (grating) formed on the polarization hologram elements 131 and 138. Diffraction angle is determined by a pitch of the grating (hereinafter, referred to as "grating pitch").

The first polarization hologram element 131 has a hologram pattern for generating three beams to detect a tracking error signal (TES).

More specifically, the light beams 120 having passed through the PBS surface 114a enter the first polarization hologram element 131, which is one of the components of the polarization/diffraction element 115. The first polarization hologram element 131 diffracts the light beams 120 to transmit three beams (main beam and two sub-beams) for detecting the TES. Details of the hologram pattern of the first polarization hologram element 131 will be described later. Examples of a TES detection method using three beams include a three beam method, a differential push-pull (DPP) method, and a phase shift DPP method.

The second polarization hologram element 138 diffracts S-polarized light but directly transmits P-polarized light, among the incoming light beams. More specifically, the second polarization hologram element 138 diffracts incoming S-polarized light to transmit zero order diffracted light (non-diffracted light) and positive and negative first order diffracted light (diffracted light).

More specifically, the P-polarized light beam 120 that has been outputted from the first polarization hologram element 131 enters and directly passes through the second polarization hologram element 138. The P-polarized light beam 120 that has passed through the second polarization hologram element 138 enters the ¼ wavelength plate 116. A specific hologram pattern (division manner) of the second polarization hologram element 138 is the same as that of the hologram element 2.

The ¼ wavelength plate 116 converts incoming linearly polarized light into circularly polarized light to output the circularly polarized light. Therefore, the P-polarized light beams 120 (linearly polarized light) that have entered the ¼ wavelength plate 116 is converted into circularly polarized light beams and outputted from the optical integrated unit 100.

As illustrated in FIG. 10, the circularly polarized light beams that have been outputted from the optical integrated unit 100 are converted into parallel light beams by the collimator lens 3, and then condensed onto the optical disk 6 through the objective lens 4. The light beams reflected from the optical disk 6, i.e. return light again pass through the objective lens 4 and the collimator lens 3, and then enters the ¼ wavelength plate 116 of the optical integrated unit 100.

The return light that enters the ¼ wavelength plate 116 of the optical integrated unit 100 is circularly polarized light. The ¼ wavelength plate 116 converts the return light into linearly polarized light (S-polarized light) having a polarized light oscillation surface in the y direction with respect to the optical axis direction (z direction) shown. The S-polarized return light enters the second polarization hologram element 138.

As described previously, the second polarization hologram element 138 diffracts the incoming S-polarized return light to transmit zero order diffracted light (non-diffracted light) and positive and negative first order diffracted light (diffracted light).

The diffracted S-polarized return light (zero order diffracted light and positive and negative first order diffracted light) enters the first polarization hologram element 131 and directly exits the first polarization hologram element 131. Then, the S-polarized return light enters the polarized beam splitter 114, is reflected by the PBS surface 114a, further reflected by the reflection mirror 114b, and outputted from the polarized beam splitter 114. The S-polarized return light outputted form the polarized beam splitter 114 is received by the light detector 112. A light receiving section pattern of the light detector 112 will be described later.

Figure 12:
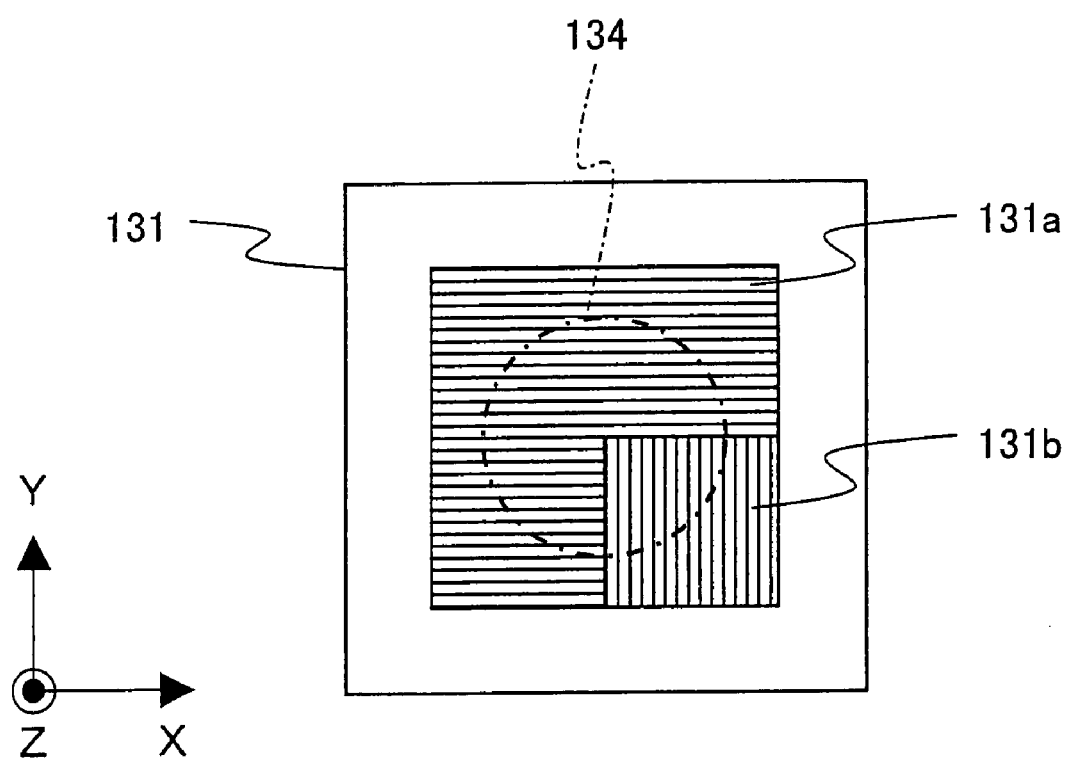
FIG. 12 is an explanatory view illustrating a hologram pattern of a first polarization hologram element used in the optical integrated unit illustrated in FIG. 11.

Next, the following will describe a hologram pattern formed on the first polarization hologram element 131 with reference to FIG. 12.

FIG. 12 is a diagram illustrating a hologram pattern formed on the first polarization hologram element 131. The hologram pattern may be a regular linear grating for detecting a tracking error signal (TES) using a three-beam method or differential push-pull (DPP) method. However, the following description assumes that a phase shift DPP method is employed.

The hologram pattern on the first polarization hologram element 131, as shown in FIG. 12, is made up of a region 131a and a region 131b. The regions 131a and 131b have a cyclic structure 180° out of phase with each other. Therefore, the push-pull signal amplitude of the sub-beam is substantially zero. Offset caused by objective lens shifting and disk tilting can be cancelled.

The more properly the light beams 120 with which the first polarization hologram element 131 is irradiated are aligned relative to the regions 131a and 131b, the more excellent offset cancellation performance is obtained. The larger an effective radius of the light beams 120, the less influence misalignments between the light beams 120 and the region 131a and between the light beams 120 and the region 131b due to changes over time and changes in temperature have. In FIG. 12, the bundle of light beams with which the first polarization hologram is irradiated is represented by reference numeral 134.

The hologram pattern formed on the second polarization hologram element 138 is the same as the hologram pattern illustrated in FIG. 1. That is, the hologram pattern of the second polarization hologram element 138 is made up of three regions (first region 2a, second region 2b, third region 2c). The SAES used for correction of spherical aberration is detected using positive first order diffracted light from the first region 2a and the second region 2b. The FES used for correction of focal point deviation is detected by a double knife edge method using positive and negative first order diffracted light from the first region 2a, the second region 2b, and the third region 2c.

In the present invention, zero order diffracted light is used for detection of a high-speed signal such as RF signal. The first and second polarization hologram elements 131 and 138 can be fabricated integrally while they are properly positioned with a mask accuracy. Therefore, the positioning of the first polarization hologram element 131 is completed simultaneously with the positioning of the second polarization hologram element 138 so that a predetermined servo signal is obtained. This allows for easy and accurate adjustment in the assembly of the optical integrated unit 100.

Further, in a case where the second polarization hologram element 138 has the division manner as illustrated in FIG. 1, the ratio of the amount of light detected from the first region 2a to that detected from the second region 2b changes when the effective radius of the bundle of light beams 47 determined by the aperture of the objective lens 4 move in a X direction (X direction) on the second polarization hologram element 138. Meanwhile, when the effective radius of the bundle of light beams 47 determined by the aperture of the objective lens 4 moves in a Y direction on the second polarization hologram element 138, the ratio of the sum of the amounts of light detected from the first region 2a and the second region 2b to the amount of light detected from the third region 2c changes. Accordingly, based on the ratio, the second polarization hologram element 138 can be positioned relative to the center of the effective diameter of the light beams 47 determined by the aperture of the objective lens 4. This eliminates the need for forming a division pattern for the positioning. Therefore, the FES can be detected by a double knife edge method using all the footprint of the light beams, which enables stable focus control.

On the contrary, in a case where the hologram element is divided by a straight line according to the conventional art illustrated in FIG. 16, positioning is impossible because the change in the amount of light cannot be obtained when there is misalignment between the center of the light beams and the center of the hologram element in the radial direction. Therefore, in order to detect a misalignment signal, a semicircle region, which is opposite to a semicircle region used for the detection of spherical aberration, must be divided by a division line extending in the track direction. This arrangement disables a stable focus control by a double knife edge method using all the footprint of the light beams.

Figure 13A:
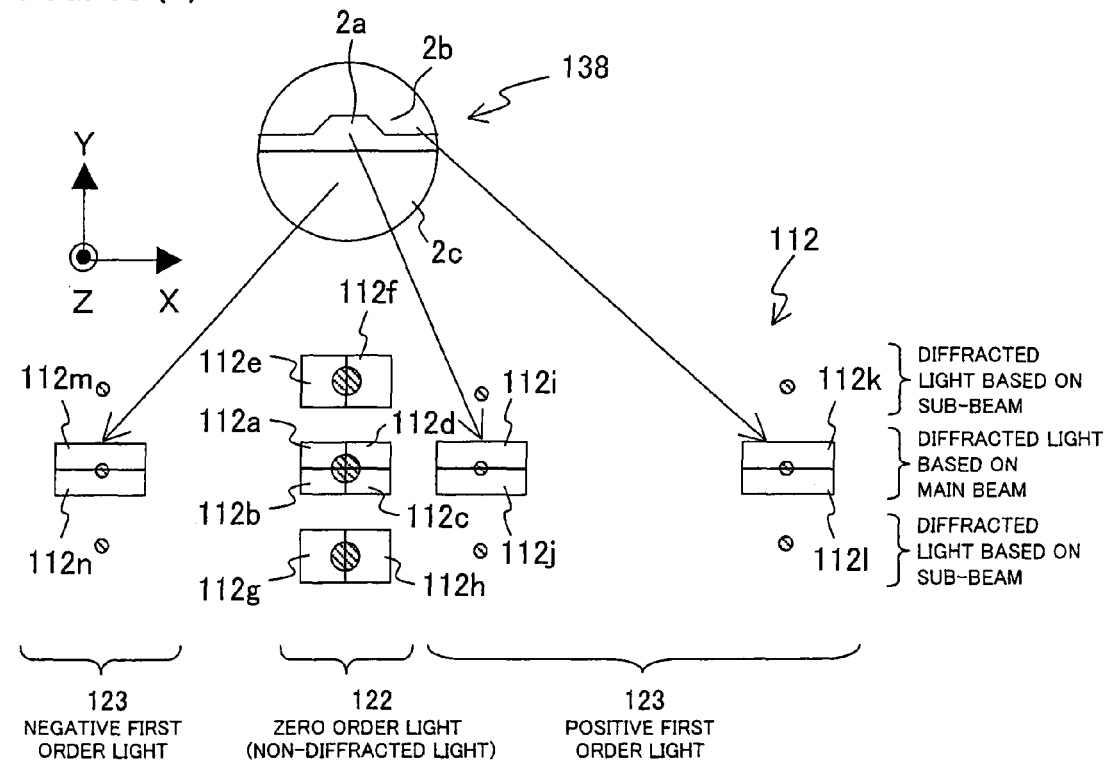
FIG. 13(a) is an explanatory view illustrating a relation between a hologram pattern of a second polarization hologram element used in the optical integrated unit illustrated in FIG. 7 and condensed light spots on a light detector and illustrating a state of condensed light beams under the condition where neither spherical aberration nor focal point deviation occurs.
Figure 13B:
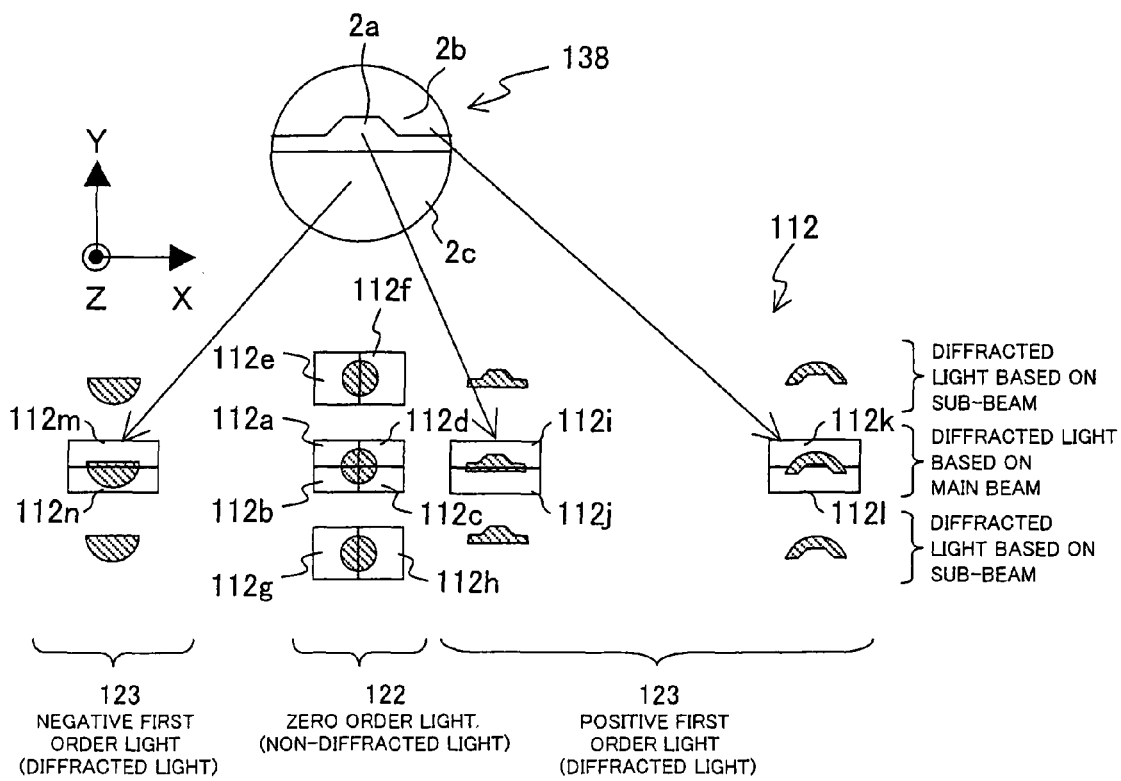
FIG. 13(b) is an explanatory view illustrating a state of condensed light beams in a case where an objective lens approaches an optical disk under the condition where no spherical aberration occurs as in FIG. 13(a).
Figure 14:
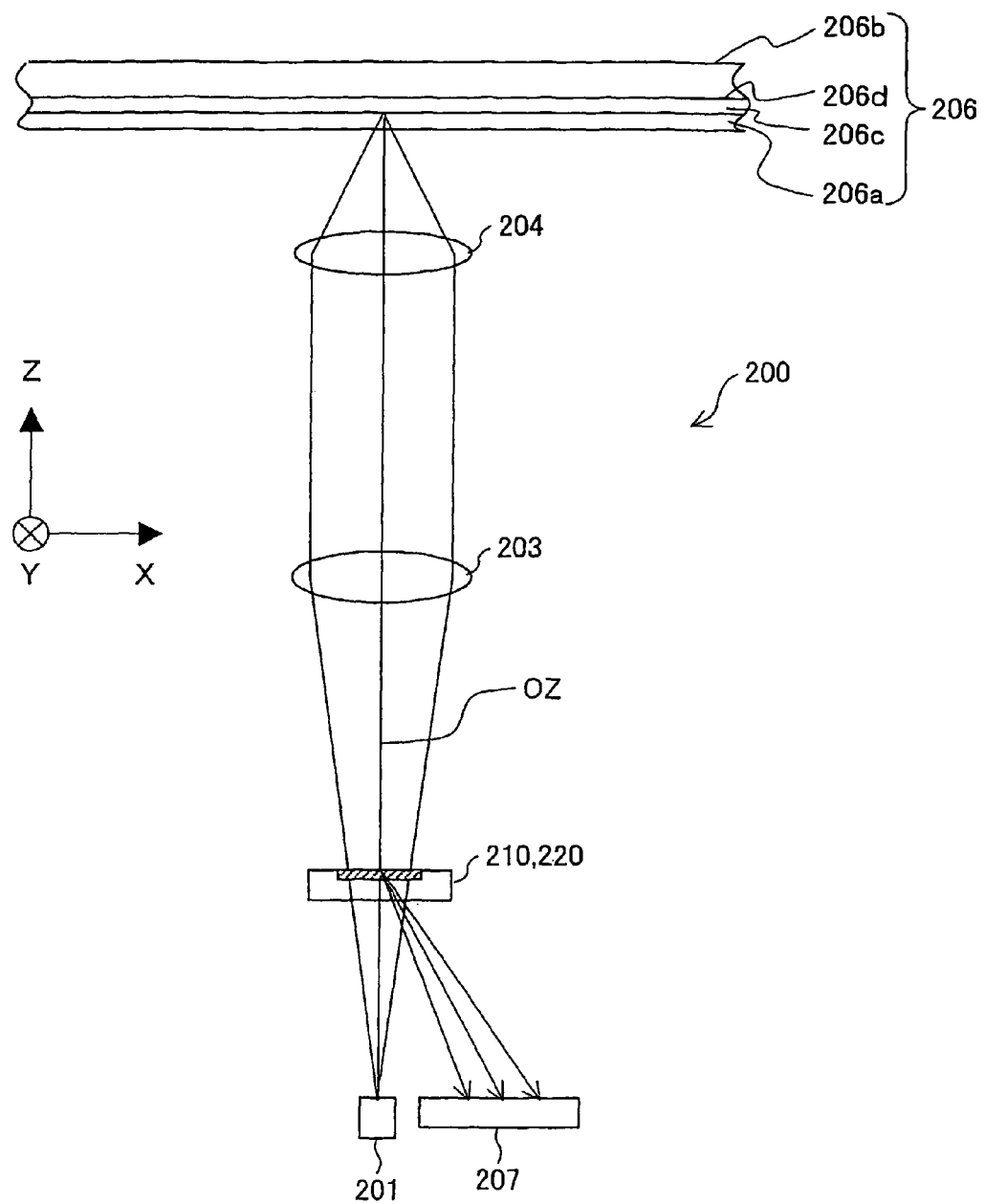
FIG. 14 is an explanatory view illustrating a general configuration of the conventional optical pickup device.

The following will describe a relation between the hologram pattern formed on the second polarization hologram element 138 and a light receiving section pattern of the light detector 112 with reference to FIGS. 13(a) and 13(b).

FIG. 13(a) shows light beams formed on the light detector 112 in a case where light beams are condensed on the information recording layer 6c so as to be properly focused thereon while the collimator lens 3 is positioned in the optical axis direction so that no spherical aberration occurs on condensed beams by the objective lens 4 when the cover glass 6a of the optical disk 6 has a thickness shown in FIGS. 6(a) and 6(b).

FIG. 13(a) also shows a relation between the three regions (first region 2a, second region, third region 2c; see FIG. 1) of the second polarization hologram element 138 and traveling directions of the positive first order diffracted light. The center of the second polarization hologram element 138 is actually located corresponding to the centers of the light receiving sections 112a through 112d. However, in FIG. 13(a), for the convenience of explanation, the second polarization hologram element 138 is displaced in the Y direction with respect to the optical axis direction (z direction).

As illustrated in FIG. 13(a), the light detector 112 is made up of fourteen light receiving sections (light receiving sections 112a through 112n). In the part of the optical system which creates light hitting the optical disk 6, the three light beams (main beam and two sub-beams) produced by the first polarization hologram element 131 are reflected from the optical disk 6. In the part of the optical system which handles reflected light from the optical disk 6, the three light beams are divided into non-diffracted light (zero order diffracted light) 122 (see FIG. 11(b)) and diffracted light (positive/negative first order diffracted light) 123 (see FIG. 11(b)) by the second polarization hologram element 138.

The light detector 112 includes light receiving sections (light receiving sections 112a through 112n) for receiving light beams required for detection of a RF signal and a servo signal among the non-diffracted light 122 and the diffracted light 123.

Specifically, the second polarization hologram element 138 produces twelve beams, i.e. three non-diffracted light beams (zero order diffracted light) 122 and nine diffracted light beams 123. The second polarization hologram element 138 is designed so that the non-diffracted light (zero order diffracted light) beams 122 can be light beams of a size enough for the detection of the TES by a push-pull method. The light detector 112 is located at a position slightly shifted backwards relative to a condensing point of the non-diffracted light 122, so that a diameter of the non-diffracted light beams (zero order diffracted light) 122 is large enough. However, the present invention is not limited to this arrangement. Alternatively, the light detector 112 may be located at a position shifted forwards relative to a condensing point of the non-diffracted light 122.

Thus, light beams having a diameter large enough are condensed onto the borders of the light receiving sections 112a through 112d. Therefore, positioning of the non-diffracted light beams 122 and the light detector 112 is possible by such adjustment that equal outputs are obtained from the four light receiving sections (light receiving sections 112a through 112d).

FIG. 13(b) shows light beams formed on the light detector 112 in a case where the objective lens 4 in FIGS. 6(a) and 6(b) approaches the optical disk 6 from the position illustrated in FIG. 13(a). When the objective lens 4 approaches the optical disk 6, a diameter of the light beams increases. However, the light beams do not extend off the light receiving sections 112a through 112n.

Next, the generation of a servo signal will be described with reference to FIGS. 13(a) and 13(b). In the following description, output signals from the light receiving sections 112a through 112n are represented by electric signals Sa through Sn, respectively.

The RF signal (RF) is detected using the zero order diffracted light. The RF signal (RF) is calculated from the following equation:

$$RF = Sa + Sb + Sc + Sd$$

The TES as detected by phase shift DPP method is calculated from the following equation:

$$TES = \{(Sa+Sb)-(Sc+Sd)\} - \alpha\{(Se-Sf)+(Sg-Sh)\}$$

where $\alpha$ is a coefficient which is set to an optimal value for canceling offset caused by objective lens shifting and optical disk tilting.

The FES is detected by a double knife edge method. The FES is calculated from the following equation:

$$FES = (Sm-Sn) - \{(Sk+Si)-(Sl+Sj)\}$$

The SAES is calculated from the following equation:

$$SAES = (Si-Sj) - k(Sk-Sl)$$

The explanation of the SAES is omitted because it is the same as the above explanation.

The aberration detection device may be an aberration detection device which includes: light beam dividing means which divides a bundle of light beams passing through a condensing optical system into a first light beam including an optical axis of the bundle of light beams and a second light beam not including the optical axis of the bundle of light beams; and spherical aberration detecting means which detects spherical aberration of the condensing optical system on the basis of focal points of the two light beams, which are obtained by the light beam dividing means, wherein the light beam dividing means includes a first region and a second region into which the light beam dividing means is divided by a border that is made up of a plurality of lines extending in a radial direction and a pair of lines that are inclined at a predetermined angle and axially symmetric to each other about a line extending in a track direction and passing through the optical axis.

Further, the aberration detection device may be such that a distance between the optical axis and the line extending in the radial direction is set to be in a range from 30% to 60% of a radius of the bundle of light beams on the light beam dividing means. Still further, the aberration detection device may be such that an inclination angle of the pair of lines is approximately 45 degrees.

The optical pickup device may be an optical pickup device which includes: a light source; a condensing optical system which causes light beams emitted from the light source to be condensed onto an optical storage medium; light beam dividing means which divides a bundle of light beams passing through the condensing optical system into a first light beam including an optical axis of the bundle of light beams and a second light beam not including the optical axis of the bundle of light beams; spherical aberration detecting means which detects spherical aberration of the condensing optical system on the basis of focal points of the two light beams, which are obtained by the light beam dividing means; and spherical aberration correcting means which corrects the spherical aberration detected by the spherical aberration detecting means, wherein the light beam dividing means includes a first region and a second region into which the light beam dividing means is divided by a border that is made up of a plurality of lines extending in a radial direction and a pair of lines that are inclined at a predetermined angle and axially symmetric to each other about a line extending in a track direction and passing through the optical axis.

Further, the optical pickup device may be such that a distance between the optical axis and the line extending in the radial direction is set to be in a range from 30% to 60% of a radius of the bundle of light beams on the light beam dividing means. Still further, the optical pickup device may be such that an inclination angle of the pair of lines is approximately 45 degrees.

The present invention can be used for an aberration detection device in which a division pattern of light dividing means is optimized so that no variation in sensitivity of an aberration detection signal occurs even when an objective lens moves at the time of tracking control, and an optical pickup device including the aberration detection device.

Further, the hologram element 2 is divided by lines D3 and D5 extending in the radial direction, and inclined line segments D4, the lines D3 and D5 having a length of 30% of an effective radius of the bundle of light beams and a length of 60% of the effective radius of the bundle of light beams, respectively. This arrangement resists the variation in detection sensitivity of the SAES due to tracking, and increases an absolute value of detection sensitivity of the SAES because a spherical aberration component in a region surrounded by the inclined line segments D4 and the lines D3 and D5 extending in the radial direction is added.

Further, the inclination angle θ of the lines is set to 45 degrees. That is, the hologram element 2 has a division manner that is similar to the division manner which maximizes detection sensitivity of the SAES. Therefore, it is possible to secure the SAES with a high signal quality.

Moreover, the arrangement in which the border of the hologram element has a plurality of lines resists influence of the objective lens shifting and decreases variation in detection sensitivity of the spherical aberration error signal event when the objective lens shifting occurs at the time of tracking control. Therefore, even when the tracking control is performed, it is possible to detect spherical aberration with accuracy all the time and correct it. According to the present invention, it is possible to optimize the division manner (division pattern) of the light beam dividing means which divides light beams.

Further, the aberration detection means of the present invention is preferably arranged such that the second border is substantially parallel to a track direction that is orthogonal to the optical axis, and has a pair of first lines and a pair of second lines, the first lines being located at the both ends of the second border so as to be axially symmetric to each other about a track line that passes through the optical axis, the second lines extending from respective first end points located on the optical axis sides of the first lines so as to approach the track line and being inclined toward the track line, and the top of the bulge is formed by connecting second end points of the second lines, the second end points being opposite to the first end points on the second lines.

The track direction herein means a direction that is parallel to a direction of a track formed on the optical storage medium. According to the above arrangement, the second lines which forms the bulge of the second border are lines that are inclined so as to be axially symmetric about the track line. With this arrangement, whether in the track direction or in the radial direction misalignment between the light beam dividing means and the bundle of light beams occurs, the amount of light beams obtained by each of the regions varies. Thus, it is possible to align the light beam dividing means and the bundle of light beams without a division pattern for the alignment.

Still further, the aberration detection device of the present invention is preferably arranged such that a distance between the first line and the first border is approximately 30% of an effective radius of the bundle of light beams on the light beam dividing means, and a distance between the top of the bulge and the first border is approximately 60% of the effective radius.

In order to obtain a higher absolute value of detection sensitivity of the spherical aberration error signal, it is desirable that light beams are divided with a radius that is approximately 70% of an effective radius of a bundle of light beams determined by the aperture of the condensing optical system. When light beams are divided in this manner, deviation of focal points of a light beam near the optical axis of the bundle of light beams and a light beam near the periphery of the bundle of light beams becomes maximum.

On the contrary, according to the above arrangement, a distance between the first line and the first border is approximately 30% of the effective radius of the bundle of light beams on the light beam dividing means, and a distance between the top of the bulge and the first border is approximately 60% of the effective radius.

The above numeric values, i.e. approximately 60% and approximately 30% were obtained by the inventor of the present invention as a result of comparison with other numeric values, and the inventor found that the above numeric values increase an absolute value of the spherical error signal and cause little variation in detection sensitivity of the spherical aberration error signal even when the tracking control occurs.

Further, the aberration detection device of the present invention is preferable that a length of the top of the bulge is approximately 60% of the effective radius.

According to the above arrangement, the division pattern of the light beam dividing means is similar to the above desirable division pattern. Therefore, it is possible to detect the spherical aberration error signal with a maximized focal point deviation of light beams divided by the division pattern of the light beam dividing means. As a result, it is possible to increase an absolute value of detection sensitivity of the spherical aberration error signal. The above numeric value, i.e. 60% was obtained by the inventor of the present invention as a result of comparison with other numeric values, and the inventor found that the above numeric value increases an absolute value of the spherical error signal and causes little variation in detection sensitivity of the spherical aberration error signal even when the tracking control occurs.

Further, the aberration detection device of the present invention is preferable such that an angle which the second line forms with the track line is approximately 45 degrees. 45 degrees was obtained by the inventor of the present invention as a result of comparison with other numeric values, and the inventor found that 45 degrees increases an absolute value of the spherical error signal.

Further, the optical pickup device of the present invention preferably includes any of the above aberration detection devices and spherical aberration correcting means which corrects the spherical aberration detected by the spherical aberration detecting means.

According to the above arrangement, it is possible to actually correct (adjust) spherical aberration on the basis of the aberration error signal obtained by the aberration detection device using the spherical aberration error correcting means. Moreover, the optical pickup device in which any of the above aberration detection device is provided is less susceptible to stray light that occurs in the optical system of the optical pickup device and unnecessary light from a nontarget information recording layer. This secures signal quality of the spherical aberration error signal, which realizes a stable spherical aberration detection.

As described above, the aberration detection device of the present invention is such that the light beam dividing means has a first border and a second border, the first border extending in a radial direction and passing through the optical axis, the second border having segments at least both ends thereof and a bulge in a center thereof, the segments being substantially parallel to the first border, the bulge bulging toward a periphery of the light beam dividing means so that a top of the bulge is substantially parallel to the first border.

Therefore, the aberration detection device of the present invention brings the effect that it is possible to sufficiently restrain the variation in detection sensitivity of the spherical aberration error signal due to the objective lens shifting at the time of tracking control while an absolute value (signal quality) of detection sensitivity of the spherical aberration error signal is secured.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention can be favorably used in adjusting an optical system of an optical pickup device which records/reproduces information onto/from an optical storage medium such as an optical disk.

The invention claimed is:

1. An aberration detection device comprising:
light beam dividing means which divides a bundle of light beams passing through a condensing optical system and reflected from an information storage medium into first light beams and second light beams, the first light beams including an optical axis of the bundle of light beams, the second light beams not including the optical axis;
light detecting means having a plurality of light receiving sections which separately receive the first light beams and the second light beams, which are obtained by the light beam dividing means; and
spherical aberration detecting means which detects spherical aberration of the condensing optical system on the basis of the amount of the first light beams received by the light receiving sections and the amount of the second light beams received by the light receiving sections, wherein
the light beam dividing means has a first border and a second border, the first border extending in a radial direction and passing through the optical axis, the second border having segments at least both ends thereof and a bulge in a center thereof, the segments being substantially parallel to the first border, the bulge bulging toward a periphery of the light beam dividing means so that a top of the bulge is substantially parallel to the first border.

2. The aberration detection device according to claim 1, wherein
the second border is substantially parallel to a track direction that is orthogonal to the optical axis, and has a pair of first lines and a pair of second lines, the first lines being located at the both ends of the second border so as to be axially symmetric to each other about a track line that passes through the optical axis, the second lines extending from respective first end points located on the optical axis sides of the first lines so as to approach the track line and being inclined toward the track line, and
the top of the bulge is formed by connecting second end points of the second lines, the second end points being opposite to the first end points on the second lines.

3. The aberration detection device according to claim 2, wherein
a distance between the first line and the first border is approximately 30% of an effective radius of the bundle of light beams on the light beam dividing means, and a distance between the top of the bulge and the first border is approximately 60% of the effective radius.

4. The aberration detection device according to claim 3, wherein
a length of the top of the bulge is approximately 60% of the effective radius.

5. The aberration detection device according to any of claims 2 through 4, wherein
an angle which the second line forms with the track line is approximately 45 degrees.

6. An optical pickup device comprising:
an aberration detection device including: light beam dividing means which divides a bundle of light beams passing through a condensing optical system and reflected from an information storage medium into first light beams and second light beams, the first light beams including an optical axis of the bundle of light beams, the second light beams not including the optical axis; light detecting means having a plurality of light receiving sections which separately receive the first light beams and the second light beams, which are obtained by the light beam dividing means; and spherical aberration detecting means which detects spherical aberration of the condensing optical system on the basis of the amount of the first light beams received by the light receiving sections and the amount of the second light beams received by the light receiving sections, wherein the light beam dividing means has a first border and a second border, the first border extending in a radial direction and passing through the optical axis, the second border having segments at least both ends thereof and a bulge in a center thereof, the segments being substantially parallel to the first border, the bulge bulging toward a periphery of the light beam dividing means so that a top of the bulge is substantially parallel to the first border; and
spherical aberration correcting means which corrects the spherical aberration detected by the spherical aberration detecting means.

7. The optical pickup device according to claim 6, wherein
the second border is substantially parallel to a track direction that is orthogonal to the optical axis, and has a pair of first lines and a pair of second lines, the first lines being located at the both ends of the second border so as to be axially symmetric to each other about a track line that passes through the optical axis, the second lines extending from respective first end points located on the optical axis sides of the first lines so as to approach the track line and being inclined toward the track line, and the top of the bulge is formed by connecting second end points of the second lines, the second end points being opposite to the first end points on the second lines.

* * * * *